United States Patent
Ning et al.

(10) Patent No.: US 12,483,156 B2
(45) Date of Patent: Nov. 25, 2025

(54) STABLE CONTROL SYSTEMS AND METHODS EMPLOYING ONE-WAY RECTIFICATION AND INTERLEAVED BOOSTER

(71) Applicant: SANTAK ELECTRONIC (SHENZHEN) CO., LTD., Shenzhen (CN)

(72) Inventors: Huahong Ning, Shenzhen (CN); Dan Liu, Shenzhen (CN); Dengke Zhang, Shenzhen (CN); Hualiang Li, Shenzhen (CN); Dawei Zheng, Shenzhen (CN)

(73) Assignee: SANTAK ELECTRONIC (SHENZHEN) CO., LTD., Shenzhen (CN)

( * ) Notice: Subject to any disclaimer, the term of this patent is extended or adjusted under 35 U.S.C. 154(b) by 218 days.

(21) Appl. No.: 18/364,059

(22) Filed: Aug. 2, 2023

(65) Prior Publication Data
US 2024/0048068 A1    Feb. 8, 2024

(30) Foreign Application Priority Data
Aug. 4, 2022    (CN) .......................... 202210931283.6

(51) Int. Cl.
*H02M 7/217*    (2006.01)
*H02M 1/00*    (2006.01)

(52) U.S. Cl.
CPC ....... *H02M 7/2173* (2013.01); *H02M 1/0009* (2021.05)

(58) Field of Classification Search
CPC .. H02M 7/2173; H02M 7/2176; H02M 7/219; H02M 7/217; H02M 7/1623; H02M 7/1626; H02M 1/0009; H02M 1/0012; H02M 1/0003; H02M 1/0006
See application file for complete search history.

(56) References Cited

U.S. PATENT DOCUMENTS

| | | | |
|---|---|---|---|
| 9,966,841 B2 * | 5/2018 | Choudhury | H02M 1/4225 |
| 2005/0207190 A1 * | 9/2005 | Gritter | H02M 1/12 363/40 |
| 2017/0317606 A1 * | 11/2017 | Cho | H02M 1/12 |

* cited by examiner

*Primary Examiner* — Nguyen Tran
(74) *Attorney, Agent, or Firm* — Stanek Lemon Crouse & Meeks, PA

(57) ABSTRACT

A stable control system for a three-phase rectification controller circuit is provided. The stable control system filters voltage harmonics and performs attenuation feedback compensation on current harmonics to enable a rectification circuit to achieve high stability and low THDi, while performing filtering on a direct current bus voltage in the case of an unbalanced load, so as to filter out voltage harmonics and enable the circuit to support the unbalanced load. A stable control system for an interleaved direct current booster circuit is also provided. The stable control system equalizes inter-leg currents such that a battery has good dynamic effects and good current equalization performance.

7 Claims, 16 Drawing Sheets

| HARMONIC TABLE | | | | |
|---|---|---|---|---|
| AMP | L1 | L2 | L3 | N |
| THD%f | 2.6 | 2.6 | 2.3 | 67.8 |
| H3%f | 0.8 | 1.4 | 0.6 | 57.3 |
| H5%f | 1.0 | 1.0 | 0.4 | 15.6 |
| H7%f | 0.9 | 0.7 | 0.6 | 11.1 |
| H9%f | 0.7 | 0.6 | 0.8 | 7.8 |
| H11%f | 0.4 | 0.5 | 0.5 | 6.3 |
| H13%f | 0.7 | 0.4 | 0.5 | 5.1 |
| H15%f | 0.3 | 0.2 | 0.3 | 3.6 |

STABLE CONTROL SYSTEMS AND METHODS EMPLOYING ONE-WAY RECTIFICATION AND INTERLEAVED BOOSTER

CROSS-REFERENCE TO RELATED APPLICATIONS

Priority is claimed to Chinese Patent Application No. 202210931283.6 filed on Aug. 4, 2022, the entire disclosure of which is hereby incorporated by reference herein.

TECHNICAL FIELD

The present invention relates to the field of uninterruptible power supply (UPS), and relates specifically to circuit control in an uninterruptible power supply, and more specifically to a stable control system and method employing one-way rectification and an interleaved direct current booster.

BACKGROUND

The on-line uninterruptible power supply can continuously supply power to the load and thus has been widely applied in various fields. The on-line uninterruptible power supply achieves uninterruptible supply of power by means of a plurality of portions, such as a rectifier module (REC), a direct current conversion module (DC/DC), etc.

The rectifier module is used to convert alternating current into direct current, and conventional three-phase rectifiers include type I NPC topology. FIG. 1 schematically illustrates a module in a three-level type I NPC topology. The three-level type I NPC topology includes three modules, and each module respectively corresponds to one of three-phase alternating current R, S, and T (also referred to as A, B, and C) phases. Conversion of a power current from an alternating current to a direct current is achieved by controlling different switching elements in each module to turn on or off, which employs power factor correction (PFC) control to achieve a high-power factor and low current total harmonic distortion (THDi). The operation of the rectifier module relates almost purely to active power (negative power), and involves very small reactive power.

The direct current conversion module implements charging and discharging functions of a battery by operating in different modes. FIG. 2 shows a conventional DC/DC two-way boost/buck topology, where boost is used as a discharging mode in which a battery (battery positive terminal Bat+ and battery negative terminal Bat−) supplies power to a load (DC to DC), and buck is used as a charging mode in which a direct current bus charges the battery. In actual application processes, in order to implement better charging and discharging functions; a dual boost/buck mode is mostly employed. That is, two boost/buck circuits connected in parallel to each other are employed, each boost/buck circuit serves as a leg (for ease of description, the two legs are respectively referred to as a leg A and a leg B), and each of the two legs can independently implement a boost/buck function, so that a dual boost/buck function can be well implemented without the need to provide an additional bus balancing circuit. In addition, in order to reduce hardware costs, researchers have proposed a UPS system where a dual-use module is shared between a rectifier and a dual boost/buck circuit. As shown in FIG. 3, an S-phase rectifier and a T-phase rectifier of a three-phase rectifier have a secondary use as a leg for dual boost (assumed to be the leg B), so that a dual-use module is used as S and T phases of the rectifier when the circuit operates in a mains mode, and the dual-use module is used as the leg B for direct current boost when the circuit operates in a battery mode. A switch is used to control the dual-use module to switch between the mains mode and the battery mode. Further, FIGS. 4(A) and 4(B) show schematic operation logic diagrams in which the dual-use leg B and the leg A are connected in parallel to each other in the UPS to achieve an interleaved dual boost/buck mode, and FIG. 5 shows a topological diagram thereof. The leg A can implement a two-way DC-DC function, and the dual-use leg B can implement a rectification (AC-DC) function or a direct current conversion (DC-DC) function. Regarding the leg B, in the mains mode, the leg B is used as the S-phase rectifier and the T-phase rectifier respectively used to provide AC-DC rectified outputs for S-phase and T-phase. When the mains power is lost, switching to the battery mode is performed, and the leg B is configured to be a booster circuit used to provide an output from the battery to the direct current bus. Regarding the leg A, in the battery mode, the leg A provides a DC-DC boost discharge output, and is configured to quickly turn on when the mains power is faulty, so as to quickly provide a direct current output from the battery to the load, and in addition, after the leg B is configured to be the booster circuit, the leg A is connected in parallel thereto so as to provide an enhanced direct current output. In the mains mode, the leg A achieves DC-DC buck to use electric energy on the direct current bus to charge the battery. As shown in FIG. 4(a), in the mains mode in which mains power is supplied normally, all the respective rectifiers of the R, S, and T phases are in operation. When the mains power is lost or faulty, it is necessary to switch from the mains mode to the battery mode to use the battery to supply power. In this case, the battery leg A is enabled, and the dual-use module is re-configured to be the lea B, so that the legs A and B operate simultaneously and enter the battery boost mode to perform battery dual boost discharging. Conversely, as shown in FIG. 4(b), in the battery mode, both of the battery boost legs A and B are in operation to provide direct current outputs for boost. When mains power resumes, it is necessary to switch from the battery mode to the mains mode to resume power supplied by the mains power. In this case, the boost leg A is configured to continue to operate, and the dual-use module is re-configured to be the S-phase and T-phase rectifiers. The battery leg A operates in the buck mode to charge the battery, and the R-phase, S-phase, and T-phase rectifiers are enabled, thereby entering the mains mode, and achieving switching from direct current power supply provided by the battery to alternating current power supply provided by a power grid.

The configuration of the dual-use module greatly reduces hardware costs, but such dual-use module configuration still faces some problems to be solved:

When the dual-use module operates in the mains mode as a rectifier, for a three-phase inversion output load, an input current of the rectifier includes obvious third harmonics. Especially in the positive and negative independent dual alternating current rectification boost topology of the one-way rectifier, the third current harmonic component is even larger, thereby worsening current total harmonic distortion, and resulting in overspecification. How to attenuate the input current of the rectifier to optimize THDi is of great significance for improvement in system performance. In addition, for an unbalanced load, a direct current bus voltage includes first harmonics, i.e., power frequency ripples. If a particular compensator is absent, the first harmonics will be transmitted to the input current of the rectifier, causing the input current to be non-equalized. In order to achieve current equalization, a compensator is required to perform optimization compensation thereon.

When the dual-use module operates in the battery mode as the boost leg B, due to the presence of two boost legs connected in parallel to each other, i.e., the leg A and the leg B, a phase interleaving mode is typically employed in order to ensure inter-leg direct current equalization and to reduce current ripples. FIG. 6 shows a schematic diagram of parallel topology pulse width modulation. It can be seen from the drawing that when the battery operates in the boost mode, PWM pulse width modulated waves of a switching transistor T2 of the leg A and a switching transistor Q1_S of the leg B operate out of phase by 180 degrees, so that a current Ibat_egA of the battery leg leg A and a current Ibat_legB of the battery leg leg B are out of phase in correspondence with each other, thereby reducing ripples of a battery total current Ibat_all. Such a parallel and modulated wave operation manner means that the phases of the direct current boost leg A and leg B are interleaved.

SUMMARY

According to a first aspect of the present inventive concept, provided is a stable control system for a three-phase rectification controller circuit, the system comprising: a rectification voltage loop controller, for acquiring a rectification input direct current bus voltage set value and a direct current bus voltage feedback positive terminal value and negative terminal value, and calculating a current effective reference value according to a difference between the rectification input direct current bus voltage set value and the direct current bus voltage feedback positive terminal value and negative terminal value; and a rectification voltage loop unbalanced load optimization compensator, for calculating a rectification voltage loop unbalanced load optimization compensation parameter according to a preset transfer function and the current effective reference value, and performing feedback compensation on the current effective reference value on the basis of the rectification voltage loop unbalanced load optimization compensation parameter so as to acquire a current direct current effective value, wherein the current direct current effective value is acquired by filtering out voltage harmonics from the current effective reference value by means of the rectification voltage loop unbalanced load optimization compensation parameter.

In some embodiments of the present inventive concept, a preset transfer function of the rectification voltage loop unbalanced load optimization compensator is:

$$G_{opt}(s) = \frac{s^2 + 2\omega_i s + \omega_o^2}{s^2 + 2\omega_i K_{opt} s + \omega_o^2}$$

where $\omega_i$ is an angular frequency deviation value, $\omega_o$ is an angular frequency of power frequency ripples, $K_{opt}$ is a compensation attenuation gain coefficient, and s is a control function operator.

In some embodiments of the present inventive concept, a preset transfer function of the rectification voltage loop unbalanced load optimization compensator is:

$$G_{opt}(s) = G_{ubl}(s) \times G_{fil}(z)$$

wherein $G_{ubl}(s)$ is a notch filter, and a transfer function thereof is $$G_{ubl}(s) = \frac{s^2 + \lambda_1 s + \omega_o^2}{s^2 + \lambda_2 s + \omega_o^2},$$

where $\lambda_1$ is a zero point damping coefficient, $\lambda_2$ is a pole damping coefficient, $\omega_o$ is an angular frequency of a compensation point, and s is a control function operator; $G_{fil}(z)$ is a filter, and a transfer function thereof is $G_{fil}(z) = FIR(z)$, FIR(z) being a finite impulse filter, and z being a discrete domain operator.

Preferably, the system further includes a rectification current feedback compensator, for acquiring a rectification input three-phase current feedback value, and calculating a feedback compensation parameter by means of a preset transfer function and according to the rectification input three-phase current feedback value, and performing harmonic gain amplification on harmonics in the rectification input three-phase current feedback value on the basis of the feedback compensation parameter to acquire a harmonic current value having undergone gain amplification, wherein the harmonic current value having undergone gain amplification is used for rectification input current feedback compensation control so as to attenuate harmonics in a rectification input current.

In some embodiments of the present inventive concept, the rectification current feedback compensator is a harmonic feedback compensator, and a preset transfer function thereof is:

$$G_{atn}(s) = H_{1th}(s) + \Sigma H_{2n+1}(s),$$

where $H_{1th}(s)$ is a rectification current first harmonic feedback compensator transfer function, $H_{2n+1}(s)$ is a rectification current odd harmonic feedback compensator transfer function, and s is a control function operator.

In some embodiments of the present inventive concept, the rectification current feedback compensator is a harmonic feedback compensator, and a preset transfer function thereof is:

$$G_{atn\_prj}(s) = H_{1th}(s) + H_{3th}(s),$$

where $H_{1th}(s)$ is a rectification current first harmonic feedback compensator transfer function, $H_{3th}(s)$ is a rectification current third harmonic feedback compensator transfer function, and s is a control function operator.

Preferably, the system further includes a rectification current loop controller, for acquiring a rectification current loop three-phase current set value and an output of the rectification current feedback compensator, and calculating a rectification current loop control parameter by means of a preset transfer function and according to a difference between the rectification current loop three-phase current set value and the output of the rectification current feedback compensator, so as to acquire a rectification current loop control output duty cycle on the basis of the rectification current loop control parameter and a difference between the rectification current loop three-phase current set value and the output of the rectification current feedback compensator, wherein the rectification current loop three-phase current set value is acquired by performing multiplication of the current direct current effective value output by the rectification voltage loop unbalanced load optimization compensator and a rectification current loop weight sine reference function, wherein the rectification current loop control output duty cycle is used to calculate the rectification input three-phase current feedback value and a rectification bus voltage feedback positive terminal value and negative terminal value.

According to a third aspect of the present inventive concept, provided is a stable control system for an interleaved direct current booster circuit, the interleaved direct current booster comprising two legs connected in parallel to each other, the two legs being a direct current boost first leg and a direct current boost second leg, respectively, and each leg being provided with an inductor. The system includes an inductive current difference loop controller, for respectively acquiring inductive currents of the first leg and the second leg of the interleaved direct current booster, calculating an inductive current difference loop control parameter by means of a preset transfer function and according to a difference between the inductive current of the direct current boost first leg and the inductive current of the direct current boost second leg, and calculating a difference loop duty cycle value according to the inductive current difference loop control parameter and the inductive currents of the first leg and the second leg of the direct current booster so as to use the same for current equalization control of a current between battery legs, wherein the difference loop duty cycle value is used to calculate a current difference between the first leg and the second leg of the direct current booster, so as to determine, according to the current difference, whether current equalization is achieved between the first leg and the second leg of the direct current booster.

In some embodiments of the present inventive concept, the inductive current difference loop controller is a proportional hysteresis controller, and a preset transfer function thereof is:

$$D_{i_{df}}(s) = K_{df} \frac{s+a}{s+b}$$

where $K_{df}$ is a proportional feedforward gain, a is a hysteresis loop zero-point, b is a hysteresis loop pole, and s is a control function operator.

Preferably, the system further includes a direct current boost bus transient voltage controller, for acquiring a direct current boost bus voltage set value, a direct current boost bus average voltage error compensation value, and a direct current boost bus voltage feedback positive terminal value and negative terminal value, calculating a direct current boost bus transient voltage control parameter by means of a preset transfer function and according to a difference between the sum of the direct current boost bus voltage set value and the direct current boost bus average voltage error compensation value and the direct current boost bus voltage feedback positive terminal value and negative terminal value, and calculating a direct current boost voltage duty cycle value according the difference between the sum of the direct current boost bus voltage set value and the direct current boost bus average voltage error compensation value and the direct current boost bus voltage feedback positive terminal value and negative terminal value and the direct current boost bus transient voltage control parameter; and a direct current boost leg duty cycle module, for respectively acquiring a direct current boost first leg duty cycle value and a direct current boost second leg duty cycle value according to the direct current boost voltage duty cycle value output by the direct current boost bus transient voltage controller and the difference loop duty cycle value output by the inductive current difference loop controller and according to a preset duty cycle calculation rule, wherein the direct current boost first leg duty cycle value and the direct current boost second leg duty cycle value are used to calculate a direct current boost bus feedback positive terminal value and negative terminal value.

In some embodiments of the present inventive concept, the preset duty cycle calculation rule is as follows: acquiring the direct current boost first leg duty cycle value according to a difference between the direct current boost voltage duty cycle value output by the direct current boost bus transient voltage controller and the difference loop duty cycle value output by the inductive current difference loop controller; and acquiring the direct current boost second leg duty cycle value according to the sum of the direct current boost voltage duty cycle value output by the direct current boost bus transient voltage controller and the difference loop duty cycle value output by the inductive current difference loop controller.

The present inventive concept advantageously provides novel rectification control and interleaved boost control. The rectification control enables harmonic attenuation to be performed on a three-phase inversion output load, so that the circuit can achieve high stability and low THDi. In addition, in the case of an unbalanced load, filtering is performed on the direct current bus voltage to filter out voltage harmonics, so that the circuit can support the unbalanced load. The interleaved boost control enables current equalization control to be performed on inter-leg currents of a boost loop, and is compatible with the loop control system, so that the battery has good dynamic effects and good current equalization performance, thereby achieving seamless transition from rectification to direct current boost. By means of the rectification control and interleaved boost control, the one-way rectification and interleaved booster employing a dual-use leg module can achieve a UPS system having high performance and low costs.

BRIEF DESCRIPTION OF THE DRAWINGS

Embodiments of the present inventive concept are further described below with reference to the accompanying drawings.

DETAILED DESCRIPTION OF THE EMBODIMENTS

Figure 1:
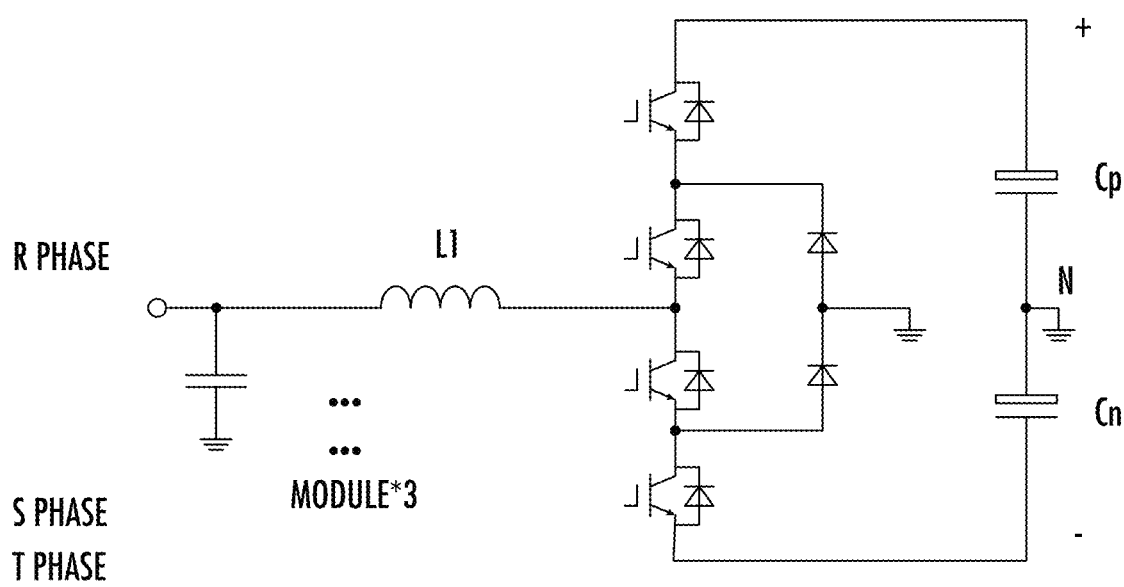
FIG. 1 is a schematic structural diagram of a three-phase rectifier type I NPC topology.
Figure 2:
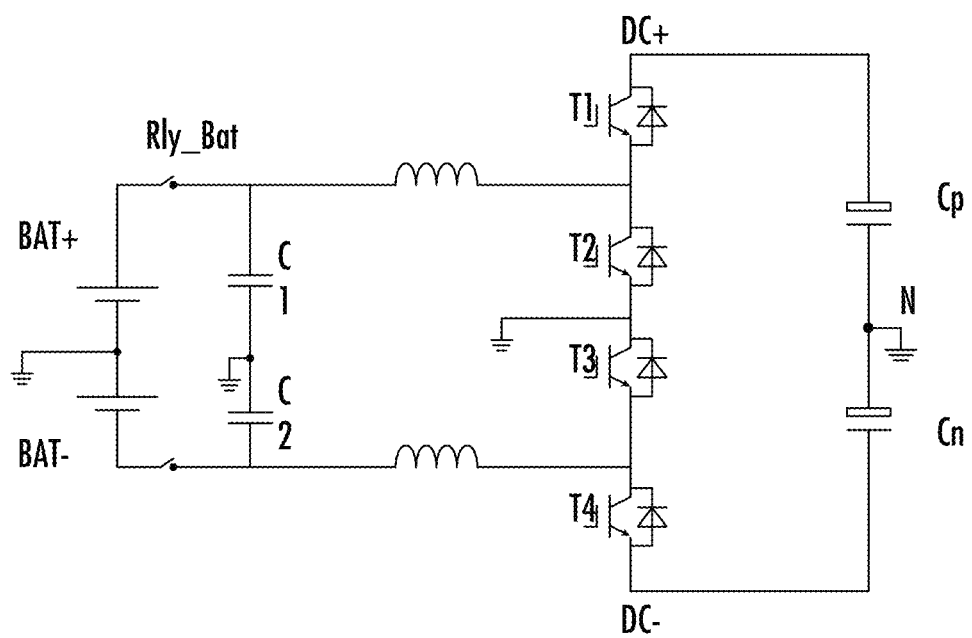
FIG. 2 is a schematic structural diagram of a DC-DC boost/buck topology.
Figure 3:
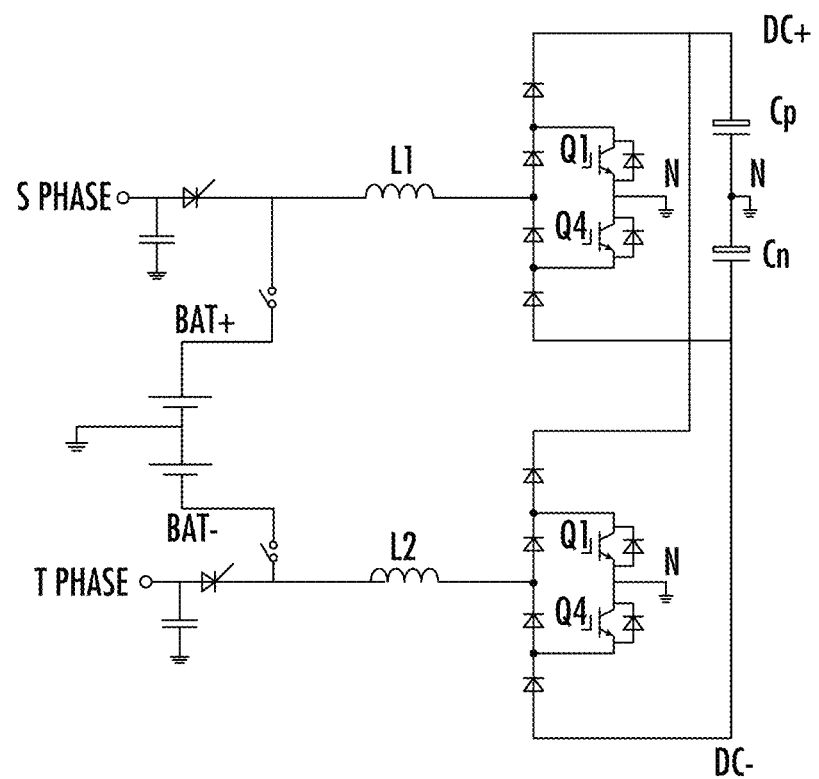
FIG. 3 is a schematic structural diagram of a rectification and boost topology of a dual-use direct current conversion module according to the prior art.

The present inventive concept is described in further detail below via specific embodiments. It should be understood that the specific embodiments described herein are only intended to explain, rather than to limit, the present inventive concept.

As described in the background, in order to reduce hardware costs of UPS, a hardware topology scheme employing one-way rectification and an interleaved booster and used for a dual-use module, in which S-phase and T-phase rectifiers have a secondary use as a leg of a parallel direct current booster is provided. The dual-use module can be switched between a one-way rectification mode and an interleaved direct current boost mode. In order to better apply the hardware topology scheme to achieve a UPS system having high performance and low costs, the present inventive concept provides a novel stable control system for this novel hardware topology scheme, so as to solve problems faced thereby in an application process.

The present inventive concept provides for performing current equalization control on the current when the phases are interleaved so as to enable the two legs to operate without affecting the voltage. The present inventive concept further provides for seamless switching (i.e., reducing the transition time) between the mains mode and the battery mode when the S-phase and T-phase rectifiers are reused as the battery direct current boost leg (the leg B) so as implement full UPS functions. Thus, the present inventive concept provides stable control systems and methods for employing one-way rectification and an interleaved booster.

According to an embodiment of the present inventive concept, a stable control system for a three-phase rectifier circuit, configured to filter voltage harmonics and perform attenuation feedback compensation on current harmonics, and a stable control system for an interleaved direct current booster circuit, configured to equalize inter-leg currents so as to provide a battery having good dynamic effects and good current equalization performance are provided.

The present inventive concept is described below in detail with reference to the accompanying drawings and embodiments.

As previously described, rectification control schemes of three-phase rectifiers are known in the art, and in the rectification control schemes, a rectifier needs to acquire a current direct current value according to direct current bus voltage feedback, and then performs rectification control. However, in the prior art, for an unbalanced load, the direct current bus voltage includes first harmonics, i.e., power frequency ripples. If a particular compensator is absent, the first harmonics will be transmitted to the input current of the rectifier, causing the input current to be non-equalized. In order to solve this problem, a compensator is added to the rectifier control system in the present invention to perform optimization compensation on the direct current bus voltage so as to filter out power frequency ripples to acquire a current direct current effective value free of the power frequency ripples.

Figure 7:
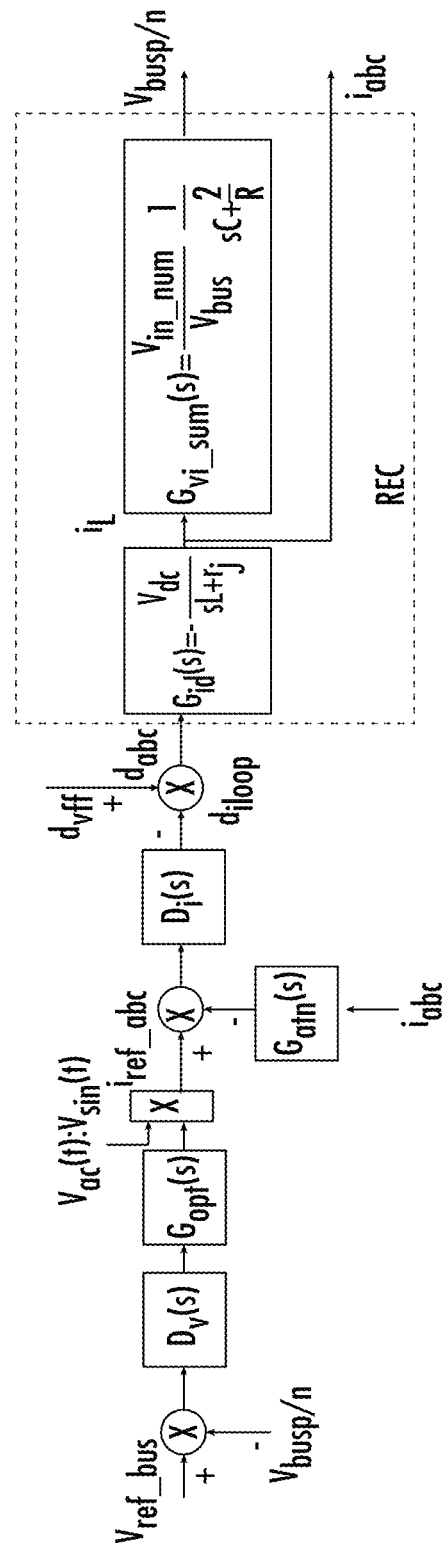
FIG. 7 is a schematic diagram of a rectification control subsystem according to an embodiment of the present inventive concept.

According to an embodiment of the present inventive concept, as shown in FIG. 7, a stable control system for a three-phase rectifier circuit includes: a rectification voltage loop controller $D_v(s)$, for acquiring a rectification input direct current bus voltage set value $V_{ref\_bus}$ and a direct current bus voltage feedback positive terminal value and negative terminal value $V_{busp/n}$, and calculating a current effective reference value according to a difference between $V_{ref\_bus}$ and $V_{busp/n}$, wherein calculation of the current effective reference value is known to those skilled in the art, and details thereof will not be described; and a rectification voltage loop unbalanced load optimization compensator $G_{opt}(s)$, for calculating a rectification voltage loop unbalanced load optimization compensation parameter according to a preset transfer function and the current effective reference value, and performing feedback compensation on the current effective reference value on the basis of the rectification voltage loop unbalanced load optimization compensation parameter so as to acquire a current direct current effective value, wherein the current direct current effective value is acquired by filtering out voltage harmonics from the current effective reference value by means of the rectification voltage loop unbalanced load optimization compensation parameter. The technique of processing, on the basis of a transfer function of a certain controller, data input into the controller is known to those skilled in the art, and details thereof will not be described in the present invention. In subsequent embodiments relating to specific implementations of the transfer function of the controller, only the transfer function itself is described, and how the controller uses the transfer function to process the input data to acquire an output will not be described in detail.

According to an embodiment of the present invention, the transfer function of $$G_{opt}(s) \text{ is } G_{opt}(s) = \frac{s^2 + 2\omega_i s + \omega_o^2}{s^2 + 2\omega_i K_{opt} s + \omega_o^2},$$

where $\omega_i$ is an angular frequency deviation value (i.e., a deviation of an actually used frequency from a standard frequency) (which may be set to 1 hz*2π), $\omega_o$ is an angular frequency of power frequency ripples, e.g., 50 hz*2π, and $K_{opt}$ is a compensation attenuation gain coefficient. As described in the background, when the hardware topology of the dual-use model operates in the mains mode, the current from the alternating current power grid is converted into the direct current. For an unbalanced load, the direct current bus voltage includes first harmonics, power frequency ripples. If a particular compensator is absent, the first harmonics will be transmitted to the input current of the rectifier, causing the input current to be non-equalized. In order to achieve current equalization, the rectification voltage loop unbalanced load optimization compensator is employed in the present inventive concept to perform optimization compensation on the voltage harmonics so as to achieve current equalization. When the load is a stable load, the current effective reference value does not include power frequency ripples, and after processing of $G_{opt}(s)$, a current direct current effective value consistent with the current effective reference value is acquired. When the load is an unbalanced load, the current effective reference value includes power frequency ripples, and the power frequency ripples are filtered out by means of $G_{opt}(s)$, so as to acquire a current direct current effective value free of the power frequency ripples.

According to an embodiment of the present inventive concept, the control period of the current loop is typically different from the control period of the voltage loop, and typically, the control period of the voltage loop is 5-10 times the control period of the current loop, so that in the discrete period, a filter $G_{fil}(z)=\text{FIR}(z)$ may be added for optimization, where FIR(z) is a finite impulse filter, and z is a discrete domain operator, and the rectification unbalanced load is fully optimized on the basis of the filter:

$$G_{opt}(s)=G_{ubl}(s) \times G_{fil}(z)$$

wherein $G_{ubl}(s)$ is a rectification voltage loop unbalanced load notch filter, and has functions similar to those of the rectification voltage loop unbalanced load optimization compensation controller without a filter added in the foregoing embodiment, and is used to acquire an optimization compensation parameter, and a transfer function thereof is $$G_{ubl}(s) = \frac{s^2 + \lambda_1 s + \omega_o^2}{s^2 + \lambda_2 s + \omega_o^2}$$

$\lambda_1$ being a zero point damping coefficient, $\lambda_2$ being a pole damping coefficient, $\omega_o$ being an angular frequency of a compensation point, and s being a transfer function operator.

Figure 8:
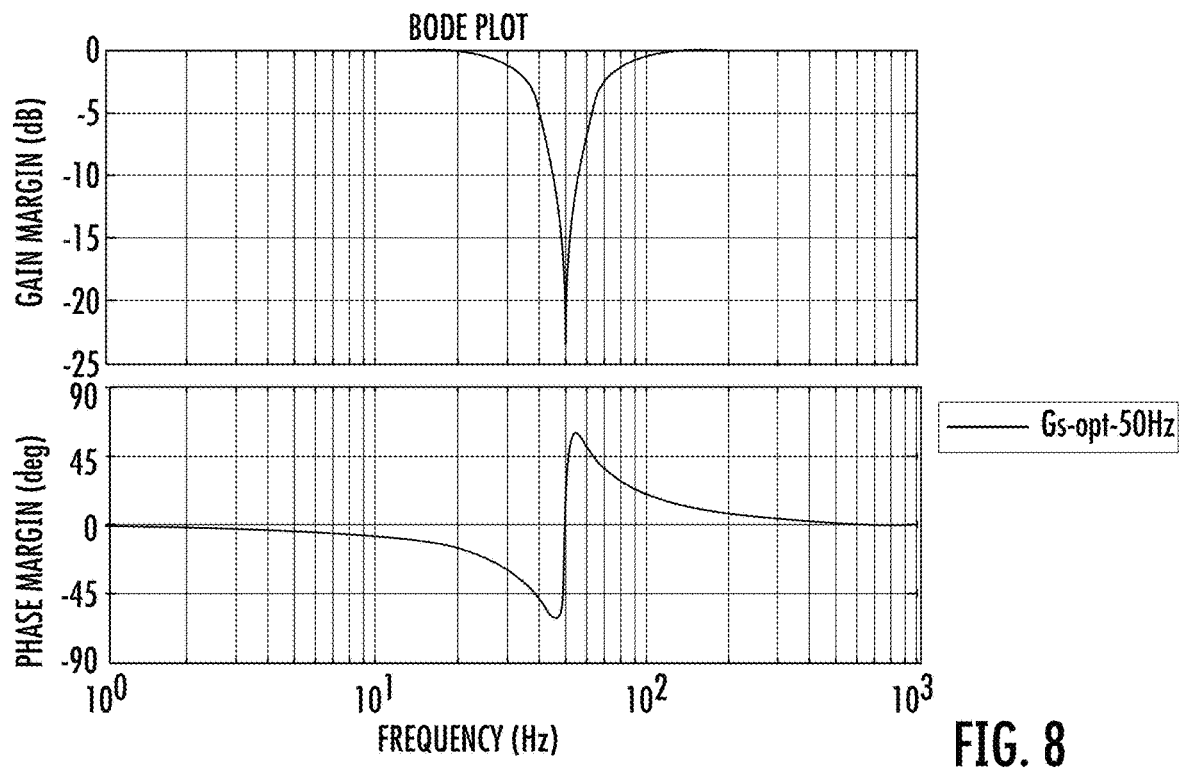
FIG. 8 is a bode plot of a transfer function of a rectification voltage loop unbalanced load filter according to an embodiment of the present inventive concept.
Figure 9:
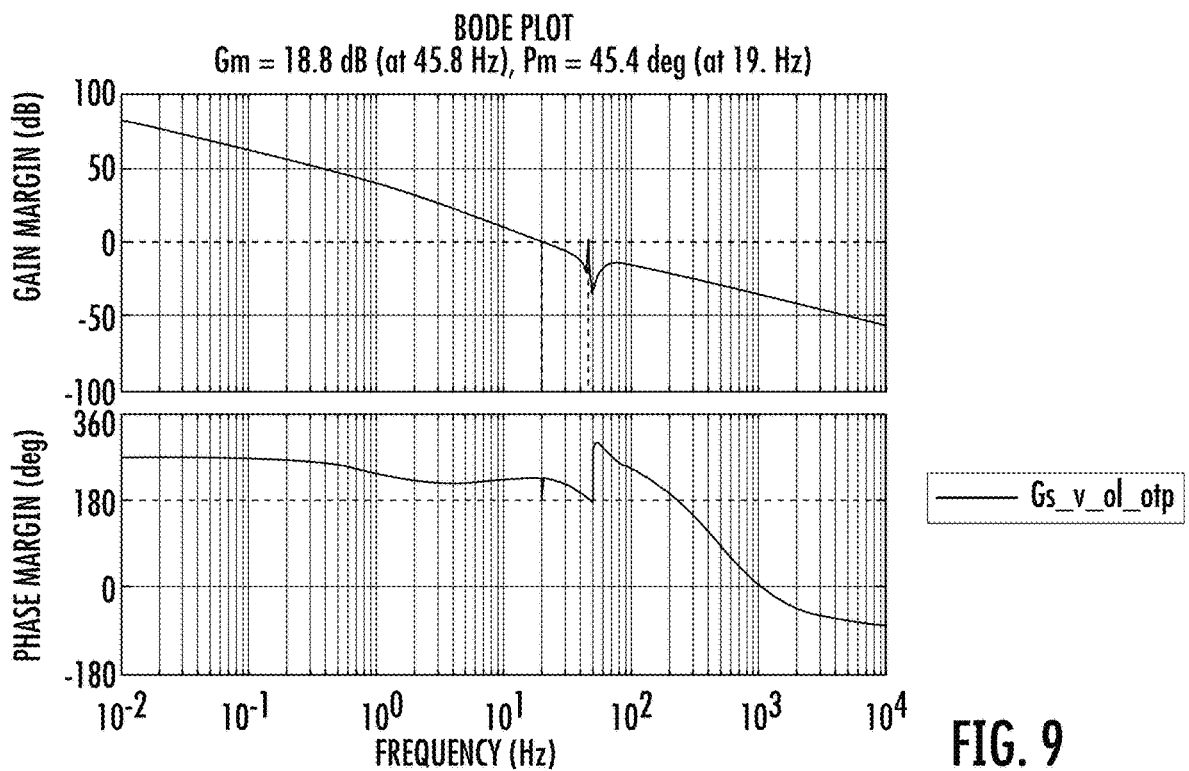
FIG. 9 is a voltage open loop bode plot of a transfer function of a current loop open loop system according to an embodiment of the present inventive concept.

Referring to the bode plot of a transfer function of a rectification voltage loop unbalanced load filter shown in FIG. 8 and the voltage open loop bode plot of a transfer function of a current loop open loop system shown in FIG. 9, a loop cross-over frequency is 19.4 Hz, a phase margin Pm=45.4 deg, and a gain margin Gm=18.8 dB. It is typically required in the field of UPS that Gm>6 and Pm>30. Therefore, it can be seen that the design of the rectification voltage loop unbalanced load optimization compensation controller can meet performance requirements.

According to an embodiment of the present inventive concept, with continued reference to FIG. 7, the system further includes: a rectification current feedback compensator $G_{atn}(s)$, for acquiring a rectification input three-phase current feedback value $i_{abc}$, calculating a feedback compensation parameter by means of a preset transfer function and according to $i_{abc}$, and performing harmonic gain amplification on harmonics in $i_{abc}$ on the basis of the feedback compensation parameter to acquire a harmonic current value having undergone gain amplification, wherein the harmonic current value having undergone gain amplification is used for rectification input current feedback compensation control so as to attenuate harmonics in a rectification input current. Specifically, the harmonic current value having undergone gain amplification is subjected to subtraction with respect to a rectification current loop three-phase current set value $i_{ref\_abc}$ including harmonics, that is, the harmonic current value having undergone gain amplification is subtracted from $i_{ref\_abc}$, so as to reduce the impact of harmonics. As mentioned for a three-phase inversion output load, an input current of the rectifier includes obvious third harmonics. Especially in the positive and negative independent dual alternating current rectification boost topology of the one-way rectifier, the third current harmonic component is even larger, thereby worsening total harmonic distortion (THDi) and resulting in overspecification. In order to solve this problem, the present inventive concept uses the rectification current feedback compensator to perform feedback compensation control on the rectification input current so as to attenuate harmonics in the rectification input current. According to an embodiment of the present inventive concept, the rectification current feedback compensator is:

$$G_{atn}(s)=H_{1th}(s)+\Sigma H_{2n+1}(s)$$

where $H_{1th}(s)$ is a rectification current first harmonic feedback compensator, and $H_{2n+1}(s)$ is a rectification current odd harmonic feedback compensator. In a preferred embodiment of the present invention, the rectification current feedback compensator employs the attenuation design of $G_{atn\_prj}(s)=H_{1th}(s)+H_{3th}(s)$, wherein $H_{3th}(s)$ is a rectification current third harmonic feedback compensator. The function of the harmonic feedback compensator is to amplify a harmonic gain. For those skilled in the art, how to amplify a harmonic gain is a known technique, and details thereof will not be described.

Figure 10:
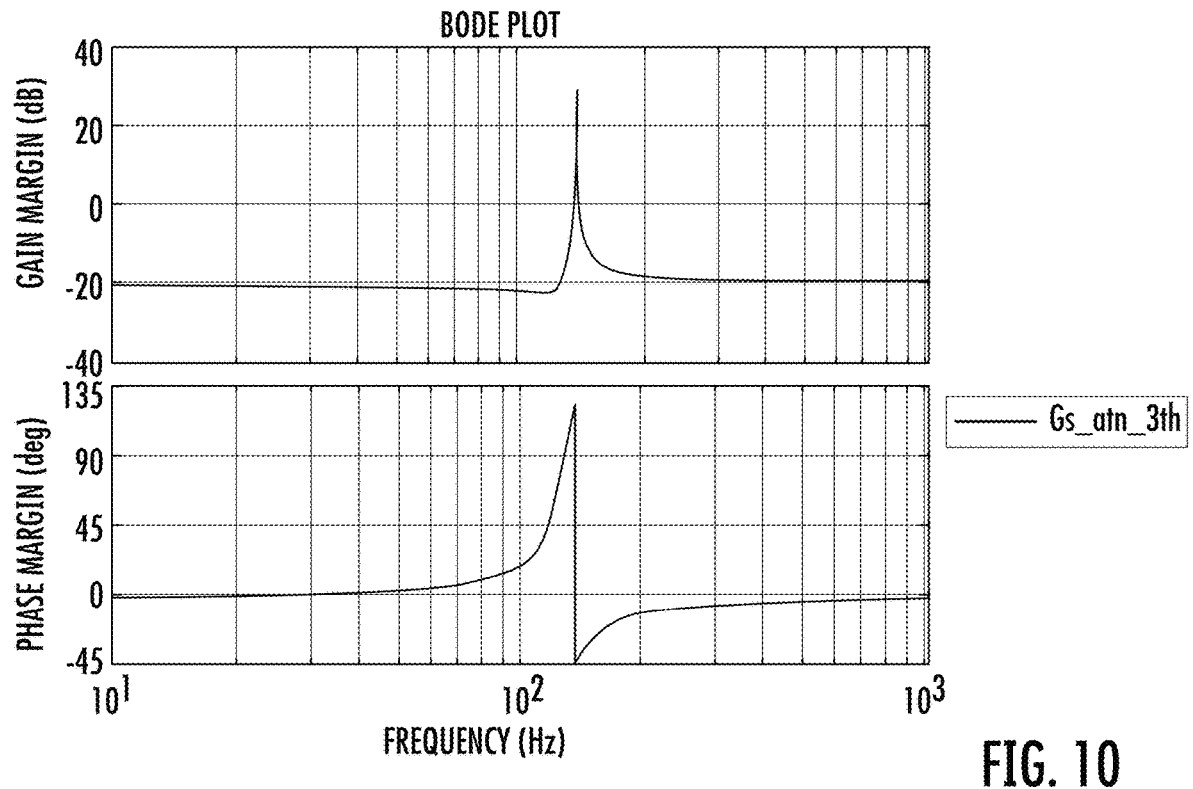
FIG. 10 is a bode plot of a third harmonic feedback compensator according to an embodiment of the present inventive concept.
Figure 11:
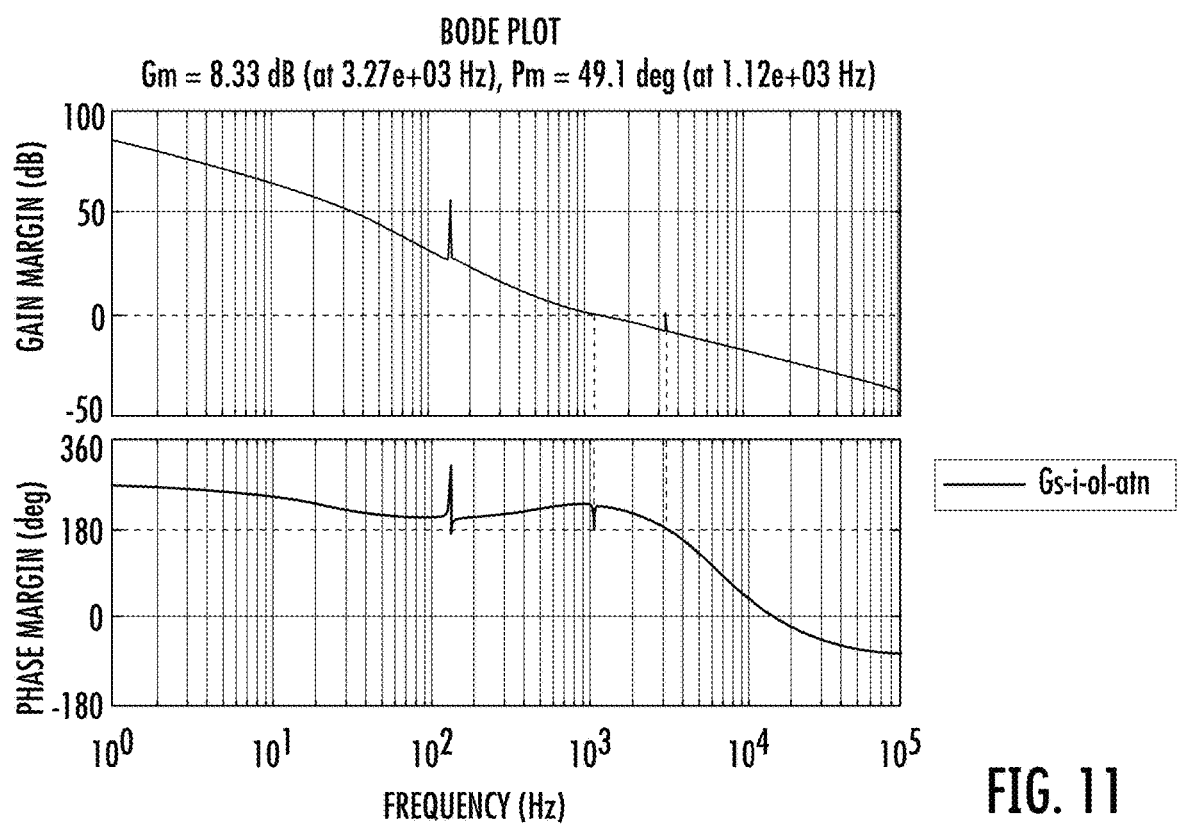
FIG. 11 is a current open loop bode plot of a transfer function of a current loop open loop system according to an embodiment of the present inventive concept.

Referring to the bode plot of a third harmonic feedback compensator shown in FIG. 10 and the current open loop bode plot of a transfer function of a current loop open loop system shown in FIG. 11, a loop cross-over frequency is 1.12 e+03 Hz, a phase margin Pm=49.1 deg, and a gain margin Gm=8.33 dB. It is typically required in the field of UPS that Gm>6 and Pm>30. Therefore, it can be seen that the design of the rectification current feedback compensation controller can meet performance requirements.

According to an embodiment of the present inventive concept, with continued reference to FIG. 7, the system further includes: a rectification current loop controller $D_i(s)$, for acquiring a rectification current loop three-phase current set value $i_{ref\_abc}$ and an output of the rectification current feedback compensator such as $G_{atn}(s)$, and calculating a rectification current loop control parameter by means of a preset transfer function and according to a difference between $i_{ref\_abc}$ and the output of $G_{atm}(s)$, so as to acquire a rectification current loop control output duty cycle $d_{iloop}$ on the basis of the rectification current loop control parameter, wherein $i_{ref\_abc}$ is acquired by performing multiplication of the current direct current effective value output by the rectification voltage loop unbalanced load optimization compensator $G_{opt}(s)$ and a rectification current loop weight sine reference function ($V_{ac}(t)$: $V_{sin}(t)$); and the rectification current loop control output duty cycle $d_{iloop}$ is used to calculate the rectification input three-phase current feedback value and a rectification bus voltage feedback positive terminal value and negative terminal value. A rectification input three-phase current duty cycle $d_{abc}$ is acquired on the basis of a difference between a rectification voltage feedforward duty cycle value $d_{vff}$ and $d_{iloop}$. The rectification input three-phase current duty cycle dabs is used to acquire the rectification input three-phase current feedback value $i_{abc}$; via a current loop controlled object transfer function $G_{id}(s)$, and $d_{abc}$ is used to acquire the rectification bus voltage feedback positive terminal value and negative terminal value $v_{buspn}$ via the current loop controlled object transfer function $G_{id}(s)$ and a voltage loop controlled object transfer function $G_{vi\_Sum}(s)$. The current loop controlled object transfer function $G_{id}(s)$ and the voltage loop controlled object transfer function $G_{vi\_Sum}(s)$ are techniques known by those skilled in the art, and details thereof will not be described in the present invention.

As described in the foregoing embodiment, after the current effective reference value is processed using the optimization compensation parameter of $G_{opt}(s)$, the impact of power frequency ripples is filtered out, so as to acquire the current direct current effective value. The current direct current effective value is multiplied by ($V_{ac}(t)$: $V_{sin}(t)$) to acquire the rectification current loop three-phase current set value $i_{ref\_abc}$. For an unbalanced load, $i_{ref\_abc}$ includes a harmonic current. The rectification current feedback compensator $G_{atm}(s)$ performs gain amplification on harmonics on the basis of the rectification input three-phase current feedback value $i_{abc}$ (in the case of a stable load, harmonics are not present, that is, the harmonic current is 0, so that gain amplification is equivalent to amplification performed on 0; in the case of an unstable load, harmonics are present, and after a harmonic gain is amplified and the harmonic current having undergone gain amplification is subtracted from $i_{ref\_abc}$, harmonics in $i_{ref\_abc}$ can be reduced), and then the impact of the harmonics can be reduced after the harmonics having undergone harmonic feedback compensation gain amplification is subtracted from the rectification current loop three-phase current set value $i_{ref\_abc}$. After the subtraction, the rectification current loop control output duty cycle $d_{iloop}$ is acquired via processing performed by means of $D_i(s)$. Then, a rectification input three-phase current duty cycle $d_{abc}$ is acquired on the basis of a difference between $d_{vff}$ and $d_{iloop}$, the rectification input three-phase current feedback value $i_{abc}$; is acquired according to $d_{abc}$ via the current loop controlled object transfer function $G_{id}(s)$, and the rectification bus voltage feedback positive terminal value and negative terminal value $v_{buspn}$ is acquired by using $d_{abc}$ in the current loop controlled object transfer function $G_{id}(s)$ and the voltage loop controlled object transfer function $G_{vi\_sum}(s)$. This process is repeated until the harmonics are filtered out. Hence, the harmonic gain amplification is performed continuously on harmonics in the current according to the rectification input three-phase current feedback value so as to use the same for feedback compensation, and the harmonic gain is amplified continuously, and is subtracted from $i_{ref\_abc}$, so as to continuously reduce harmonics in $i_{ref\_abc}$.

It should be noted that, in order to achieve a sufficient phase margin and gain margin, $D_i(s)$ is herein selected to be PI+Lead (PI plus a lead compensation loop) to ensure that the control system has a small net difference and a sufficient phase margin. According to an embodiment of the present invention, $$D_i(s) = K_p\left(1 + \frac{1}{T_i s}\right)\left(\frac{aT_{lead}s + 1}{T_{lead}s + 1}\right),$$

where $K_p$ is a proportion coefficient, $T_i$ is an integration constant, $$\frac{aT_{lead}s + 1}{T_{lead}s + 1}$$

is lead compensation, a is a coefficient for controlling a lead phase, and $T_{lead}$ is approximately a lead bandwidth time constant. Meanwhile, a load change is addressed via a magnetic variable inductor and an inductance gain compensator in the hardware topology.

Figure 12:
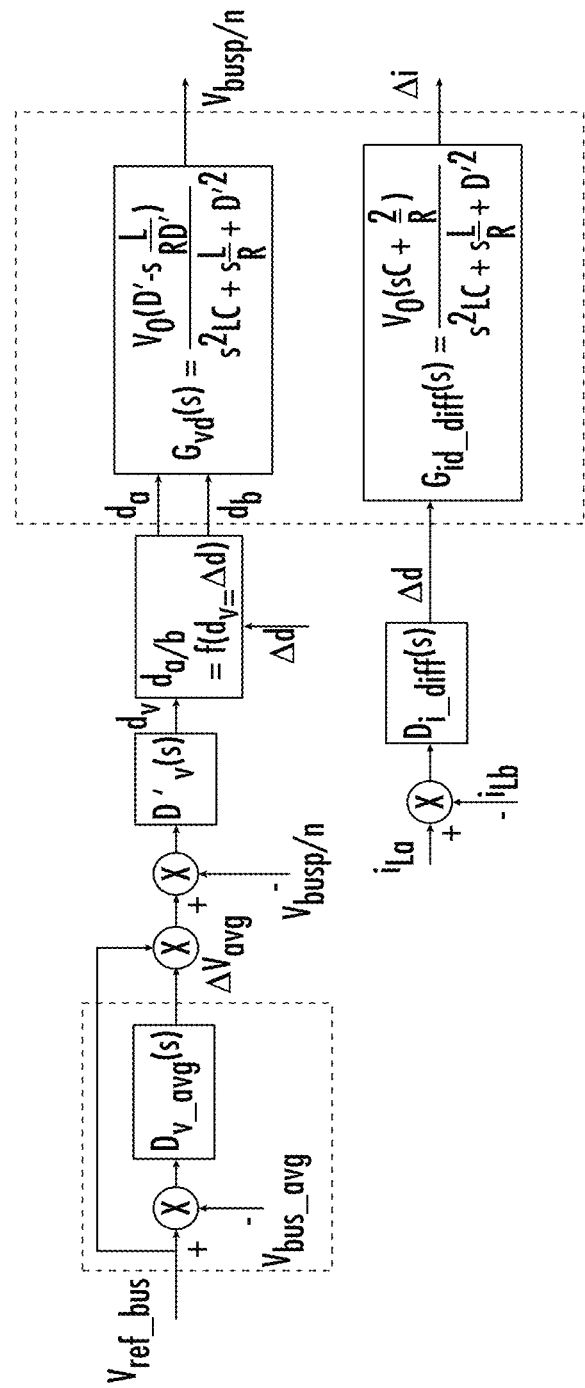
FIG. 12 is a schematic diagram of an interleaved boost control subsystem according to an embodiment of the present inventive concept.

According to an embodiment of the present inventive concept, as shown in FIG. 12, a stable control system for controlling an interleaved direct current boost circuit of the present inventive concept includes: an inductive current difference loop controller $D_{i\_dff}(s)$, for respectively acquiring inductive currents $i_{Lb}$ of the first leg $i_{La}$ and the second leg of the interleaved direct current booster, calculating an inductive current difference loop control parameter by means of a preset transfer function and according to a difference between the inductive current of the direct current boost first leg and the inductive current of the direct current boost second leg, and calculating a difference loop duty cycle value Δd according to the inductive current difference loop control parameter and the inductive currents of the first leg and the second leg of the direct current booster so as to use the same for current equalization control of a current between battery legs, wherein the difference loop duty cycle value Δd is used to calculate a current difference Δi between the first leg and the second leg of the direct current booster, so as to determine, according to the current difference, whether current equalization is achieved between the first leg and the second leg of the direct current booster. When current equalization is achieved between the two legs, Δi=0. When current equalization is not achieved between the two legs, Δi is not equal to 0. Specifically, Δd is used to acquire the current difference Δi between the two legs of the battery via a direct current boost inter-leg current difference loop controlled object function $D_{id\_dff}(s)$. Those skilled in the art would know that $G_{id\_dff}(s)$ is a common transfer function for a circuit control system, so that details thereof will not be described. The present inventive concept employs the inductive current difference loop controller $D_{i\_dff}(s)$ to make the used boost loop control system compatible with the interleaved boost control system, and a current sharing loop is added to the duty cycle portion so as to achieve inter-leg current equalization.

Figure 13:
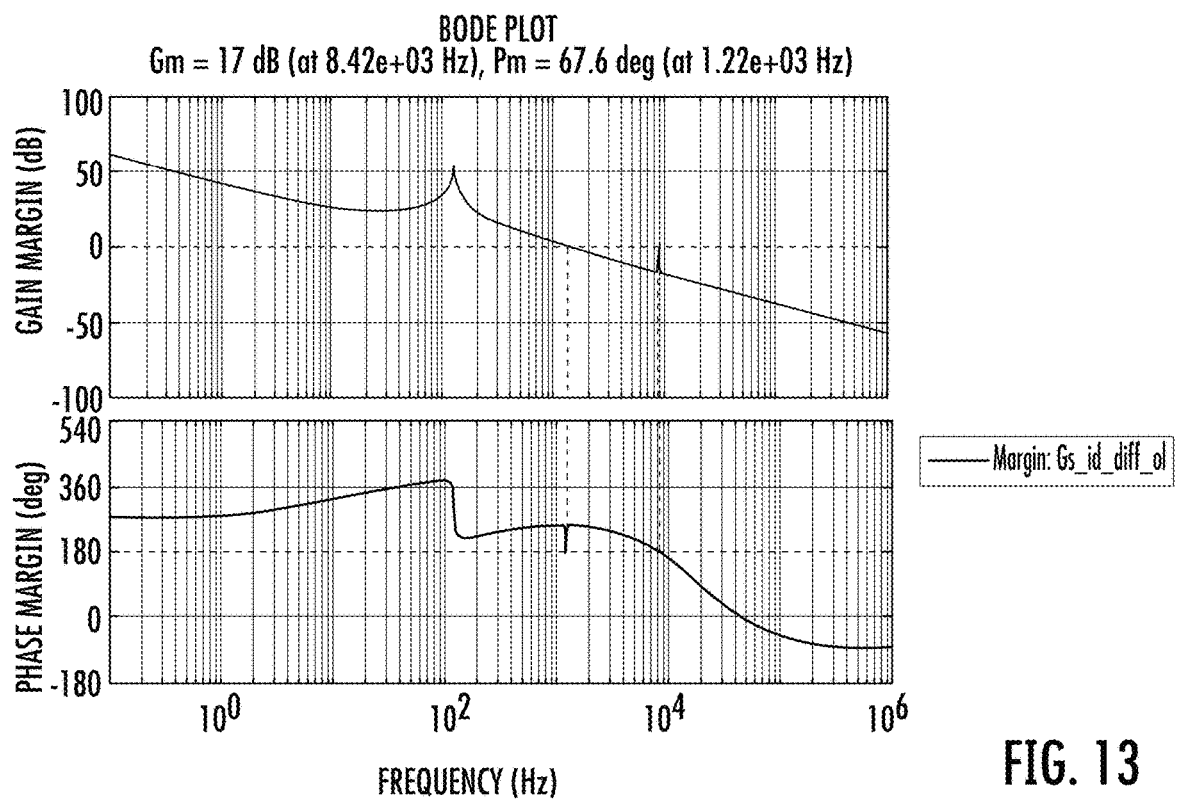
FIG. 13 is a simplified inter-leg current sharing open loop bode plot according to an embodiment of the present inventive concept.

Referring to the simplified inter-leg current sharing open loop bode plot shown in FIG. 13, a loop cross-over frequency is 1.22 e+03 Hz, a phase margin Pm=67.6 deg, and a gain margin Gm=17 dB. It is typically required in the field of UPS that Gm>6 and Pm>30. Therefore, it can be seen that the design of the inductive current difference loop controller can meet performance requirements. Regarding on/off of a multi-leg topology, only on or off of $D_{i\_diff}(s)$ needs to be configured, so that a multi-leg hardware topology including two or more legs, such as an n-leg topology (n>2), an ish-loop topology, etc., can be more easily achieved. In the n-leg topology, a difference loop duty cycle of an n-th leg is $\Delta d_{nth}=(i_{Lavg}-i_{Lnth})D_{i\_diff}(s)$, wherein $i_{Lavg}$ is an inductive current average value of the n-th leg in the direct current boost, and $i_{Lnth}$ is an inductive current value of the n-th leg in the direct current boost.

According to an embodiment of the present inventive concept, the inductive current difference loop controller is a proportional hysteresis controller, and a transfer function thereof is:

$$D_{idiff}(s) = K_{diff} \frac{s+a}{a+b},$$

where $K_{diff}$ is a proportional feedforward gain, a is a hysteresis loop zero point, b is a hysteresis loop pole, and s is a control function operator.

According to an embodiment of the present invention, with continued reference to FIG. 12, the system further includes: a direct current boost bus transient voltage controller $D'_v(s)$, for acquiring a direct current boost bus voltage set value $v_{ref\_bus}$, a direct current boost bus average voltage error compensation value $\Delta V_{avg}$, and a direct current boost bus voltage feedback positive terminal value and negative terminal value $v_{buspin}$, calculating a direct current boost bus transient voltage control parameter by means of a preset transfer function and according to $v_{ref\_bus}+\Delta V_{avg}-v_{buspin}$, and calculating a direct current boost voltage duty cycle value $d_v$ according to $v_{ref\_bus}+\Delta V_{avg}-v_{buspin}$ and the direct current boost bus transient voltage control parameter; and a direct current boost leg duty cycle module $d_{a/b}$, for respectively acquiring a direct current boost first leg duty cycle value $d_a$ and a direct current boost second leg duty cycle value $d_b$ according to $d_v$ output by the direct current boost bus transient voltage controller and $\Delta d$ output by the inductive current difference loop controller and according to a preset duty cycle calculation rule, wherein $d_a$ and $d_b$ are used to calculate a direct current boost bus feedback positive terminal value and negative terminal value. Specifically, $d_a$ and $d_b$ are used to acquire the direct current boost bus feedback positive terminal value and negative terminal value $v_{buspin}$ by means of a direct current boost voltage loop controlled object transfer function $G_{vd}(s)$. Those skilled in the art would know that $G_{vd}(s)$ is a common transfer function for a circuit control system, so that details thereof will not be described in the present invention.

According to an embodiment of the present inventive concept, a preset duty cycle calculation rule of the direct current boost leg duty cycle module $d_{a/b}$ is as follows:

$d_{a/b}=f(d_v,\Delta d)$ $d_a=d_v-\Delta d$ $d_b=d_v+\Delta d$

As described in the foregoing embodiment, the inductive current difference loop controller $D_{idiff}(s)$ acquires the difference loop duty cycle according to the current between the two legs. The difference loop duty cycle indicates the status of current non-equalization between the two legs. If the current between the two legs is equalized, then $i_{La}=i_{Lb}$, $\Delta d=0$, $\Delta i=0$, and $d_a=d_b$. If the current between the two legs is not equalized, $i_{La}$ is not equal to $i_{Lb}$, $\Delta d$ is greater than 0 or less than 0, and $\Delta i$ is also greater than 0 or less than 0. If $\Delta d$ is greater than 0, $\Delta i$ is also greater than 0, indicating that $i_{La}$ is greater than $i_{Lb}$. In order to achieve current equalization, the duty cycle of the first leg needs to be decreased, and the duty cycle of the second leg needs to be increased. The duty cycle of the first leg can be decreased by $d_a=d_v-\Delta d$, and the duty cycle of the second leg can to be increased by $d_b=d_v+\Delta d$, and vice versa. Thus, current equalization between two legs in an interleaved direct current boost circuit can be achieved on the basis of the inductive current difference loop controller $D_{i\_diff}(s)$ and the direct current boost leg duty cycle module $d_{a/b}$ of the present invention.

When a plurality of legs are present, the direct current boost voltage duty cycle $d_{nth}$ of the nth leg is: $d_{nth}=d_v+\Delta d_{nth}$.

Figure 14:
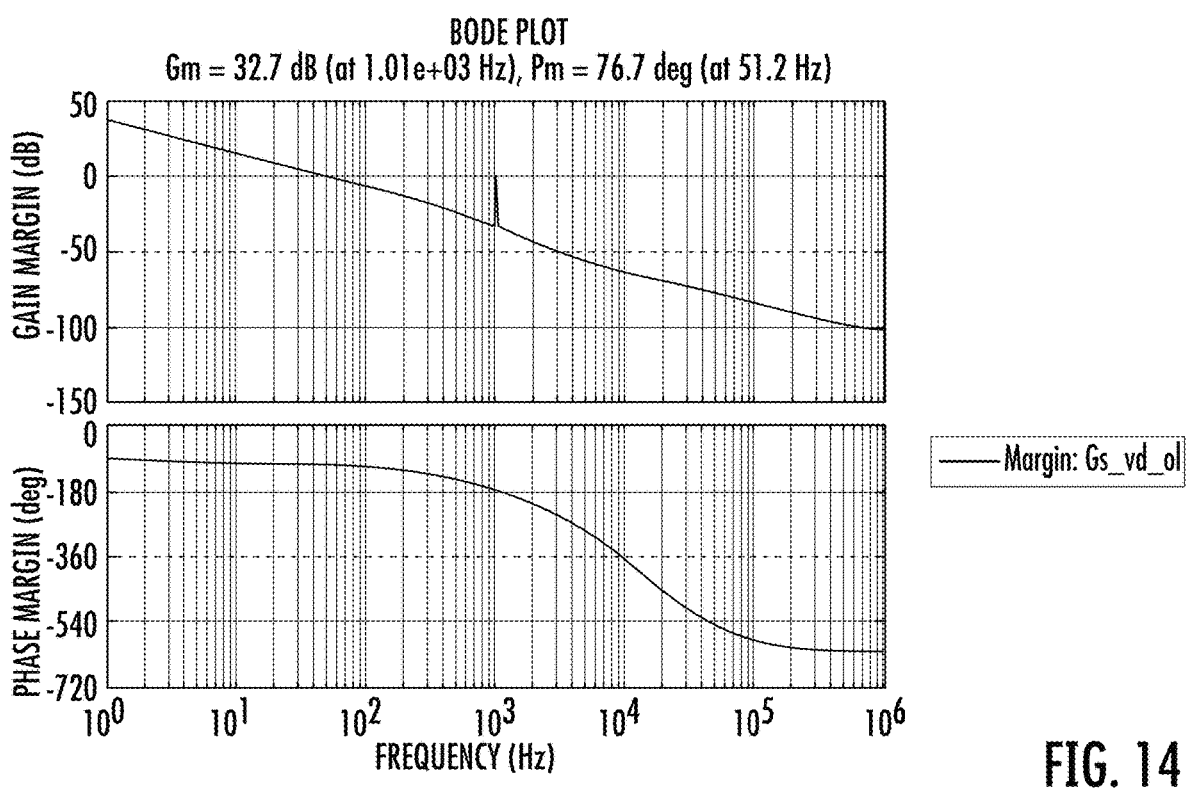
FIG. 14 is a simplified alternating current boost open loop bode plot according to an embodiment of the present inventive concept.

Referring to the simplified alternating current boost open loop bode plot shown in FIG. 14, a loop cross-over frequency is 51.2 Hz, a phase margin Pm=76.76 deg, and a gain margin Gm=32.7 dB. It is typically required in the field of UPS that Gm>6 and Pm>30. Therefore, it can be seen that the design of the direct current boost leg duty cycle module can meet performance requirements. On the basis of the design, in a topology employing a dual-use leg module, only a shared loop of operation of two legs needs to be configured, and the boosted voltage loop is not affected, thereby achieving high compatibility.

Figures 4A, 4B:
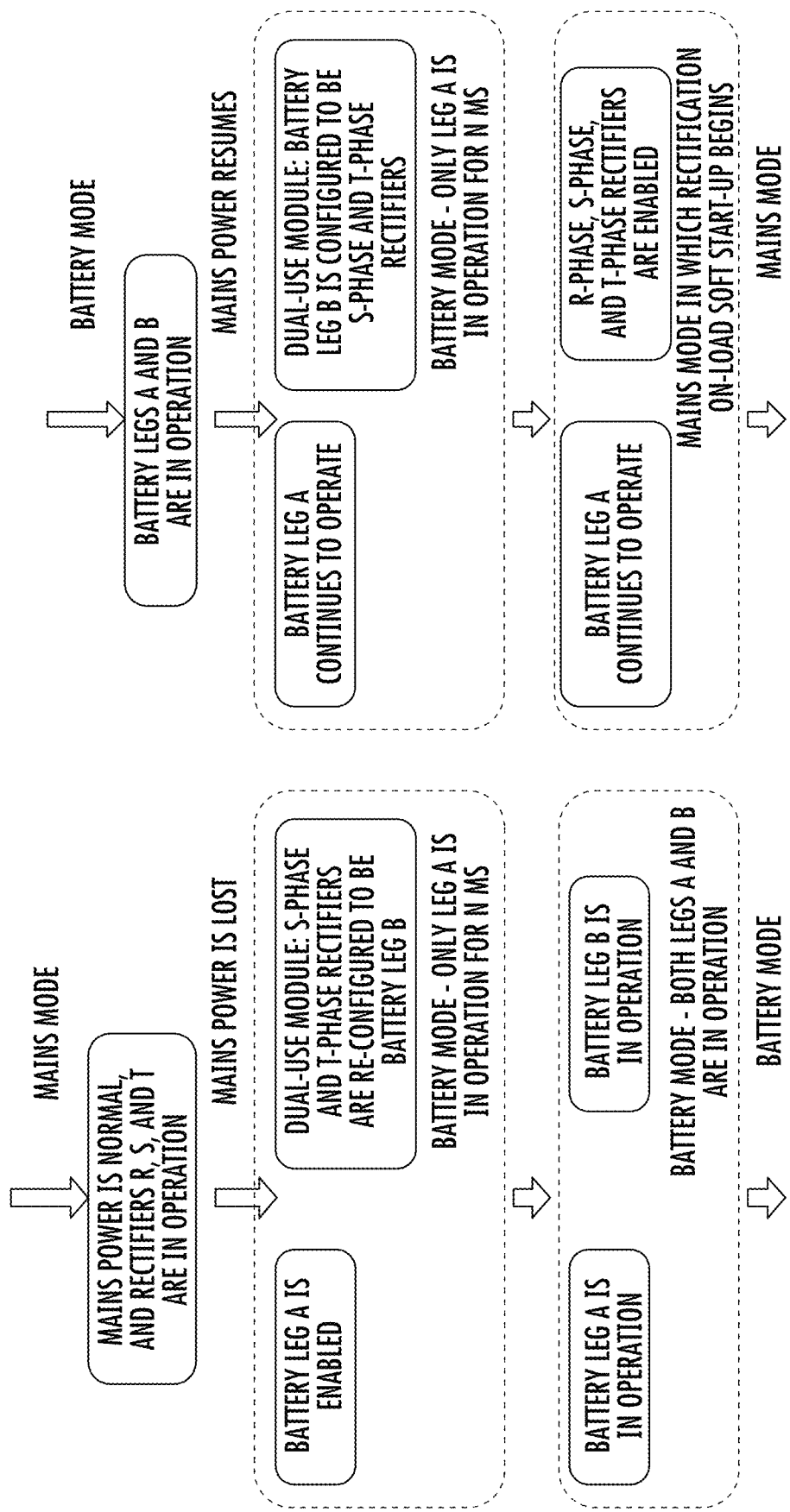
FIGS. 4(A) and 4(B) are schematic operation logic diagrams of an interleaved boost circuit of a dual-use direct current conversion module according to the prior art.
Figure 5:
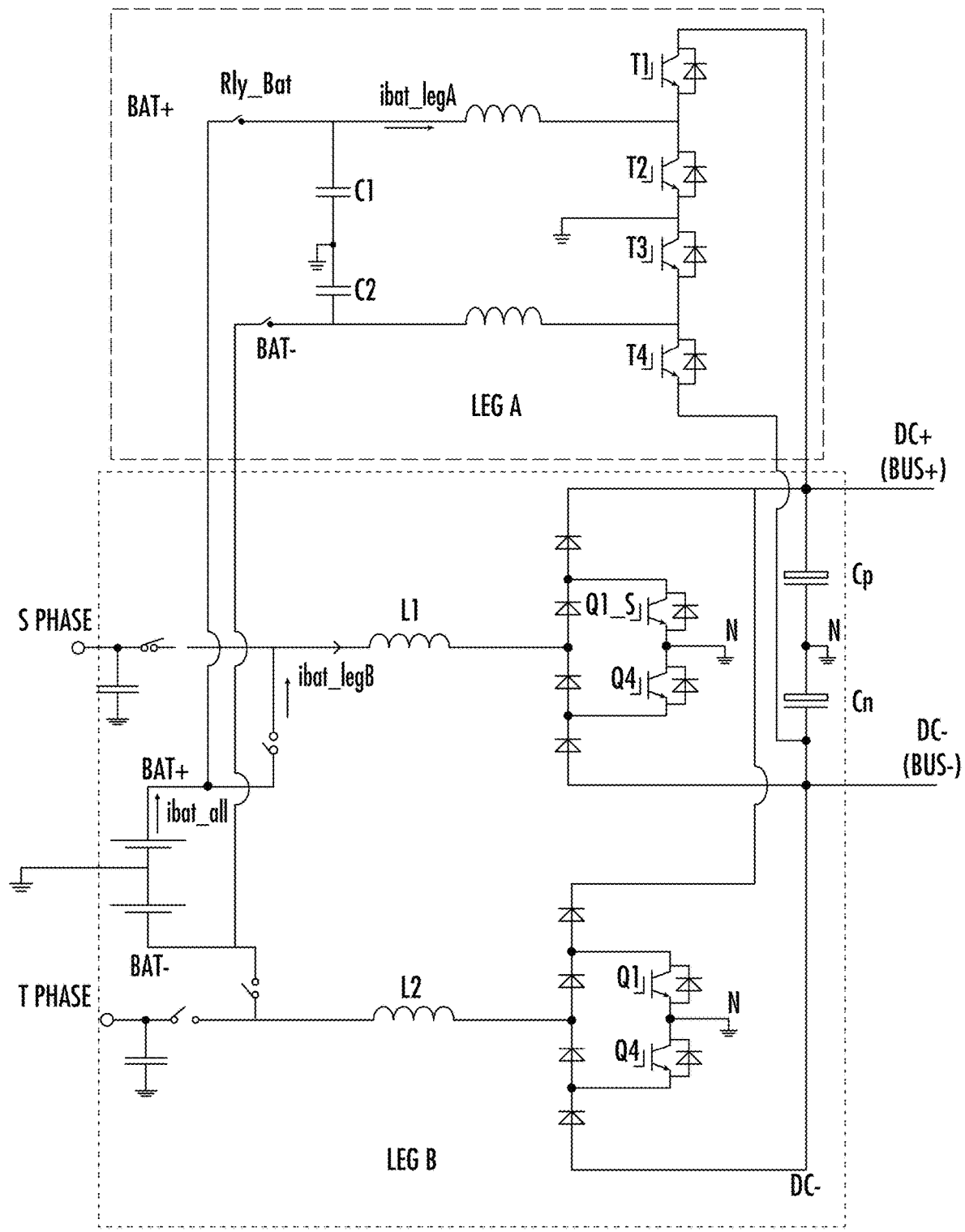
FIG. 5 is a schematic diagram of a topology of an interleaved boost circuit of a dual-use direct current conversion module according to the prior art.
Figure 6:
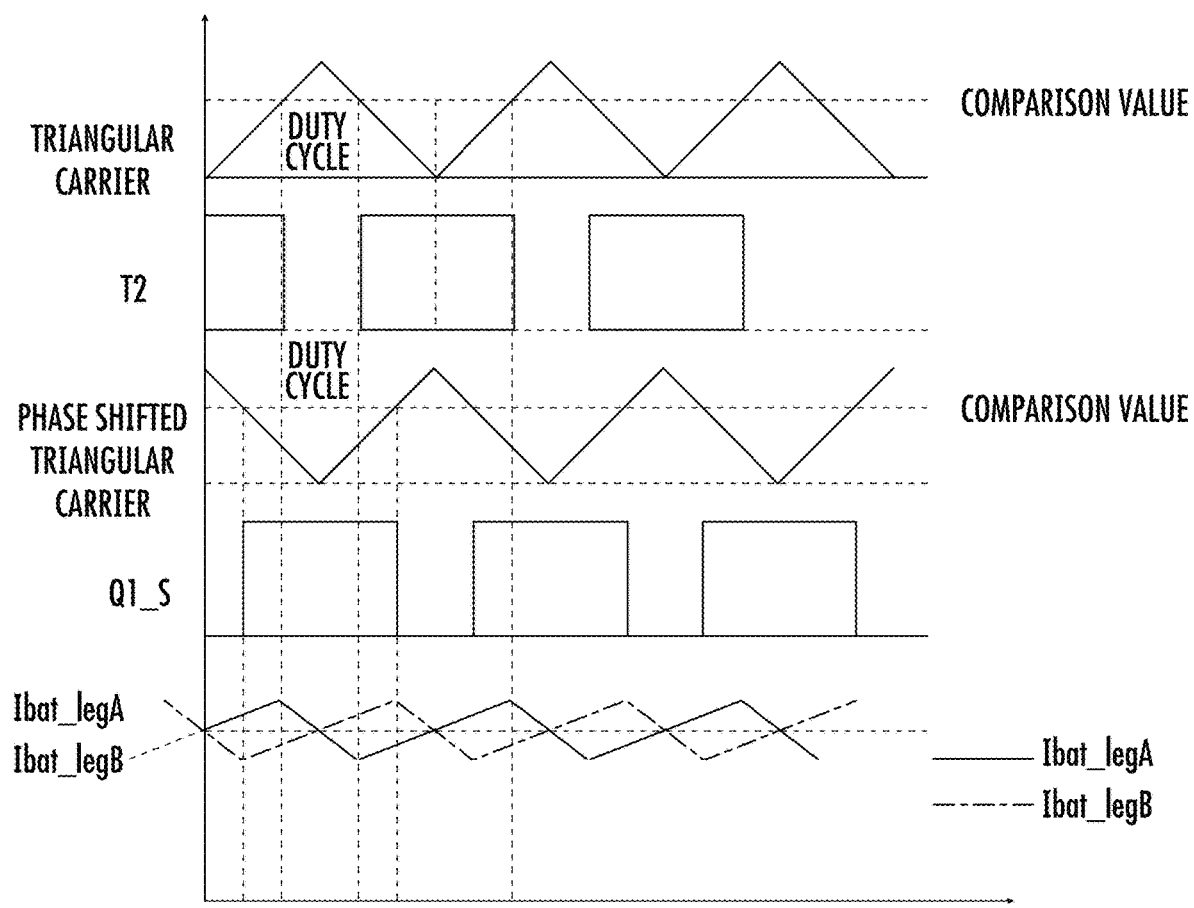
FIG. 6 is a schematic diagram of pulse width modulation of an interleaved boost circuit of a dual-use direct current conversion module according to the prior art.

On the basis of the above control system, seamless switching between one-way rectification and an interleaved booster by means of a dual-use leg module can be achieved. As shown in FIG. 4(a), in the mains mode (that is, mains power is supplied normally), the R-phase, S-phase, and T-phase rectifiers are in operation. When the mains power is lost, it is necessary to switch from the mains mode to the battery mode to use the battery to supply power. In this case, the boost mode of the battery leg A is enabled so as to ensure that one leg supplies power during switching, and power supply of the UPS is not interrupted. The dual-use module is configured to switch from the ST phase rectifier mode to the battery boost leg B mode so as to enter the battery mode. Before mode switching is completed, the duration of operation of the battery leg A is at the scale of ms. Then, the leg leg A and the leg B are both in operation, entering the battery boost mode to perform battery dual boost discharging. Conversely, as shown in FIG. 4(b), in the battery mode, both of the battery boost leg leg A and leg B are in operation, and when the mains power resumes, it is necessary to switch from the battery mode to the mains mode to resume power supplied by the mains power. In this case, the boost leg A is configured to continue to operate, and the dual-use module is configured to change from the boost leg B to the S-phase and T-phase rectifiers. The continuous operation of the battery leg A ensures that one leg supplies power during switching, and before the mode switching is completed, the duration of operation of the battery leg A is at the scale of ms. Then, the R-phase, S-phase, and T-phase rectifiers are enabled, thereby entering the mains mode, and achieving switching from battery direct current power supply to power grid alternating current power supply. Then, the battery leg A switches to a buck mode to charge the battery. It can be seen that in the dual-use module, the S-phase and T-phase rectifiers have a secondary use as the battery direct current boost leg B. During line-battery mode switching, there is only a short duration in which only the battery leg A operates to supply power to the load, which serves as an excess of the S-phase and T-phase rectifiers and the battery direct current boost leg B. In addition, rectification input is silicon controlled, thereby shortening a switching time and achieving seamless switching.

In order to better illustrate the effect of the present inventive concept, the present inventive concept is described below with reference to simulation and emulation experiment data.

Figure 15:
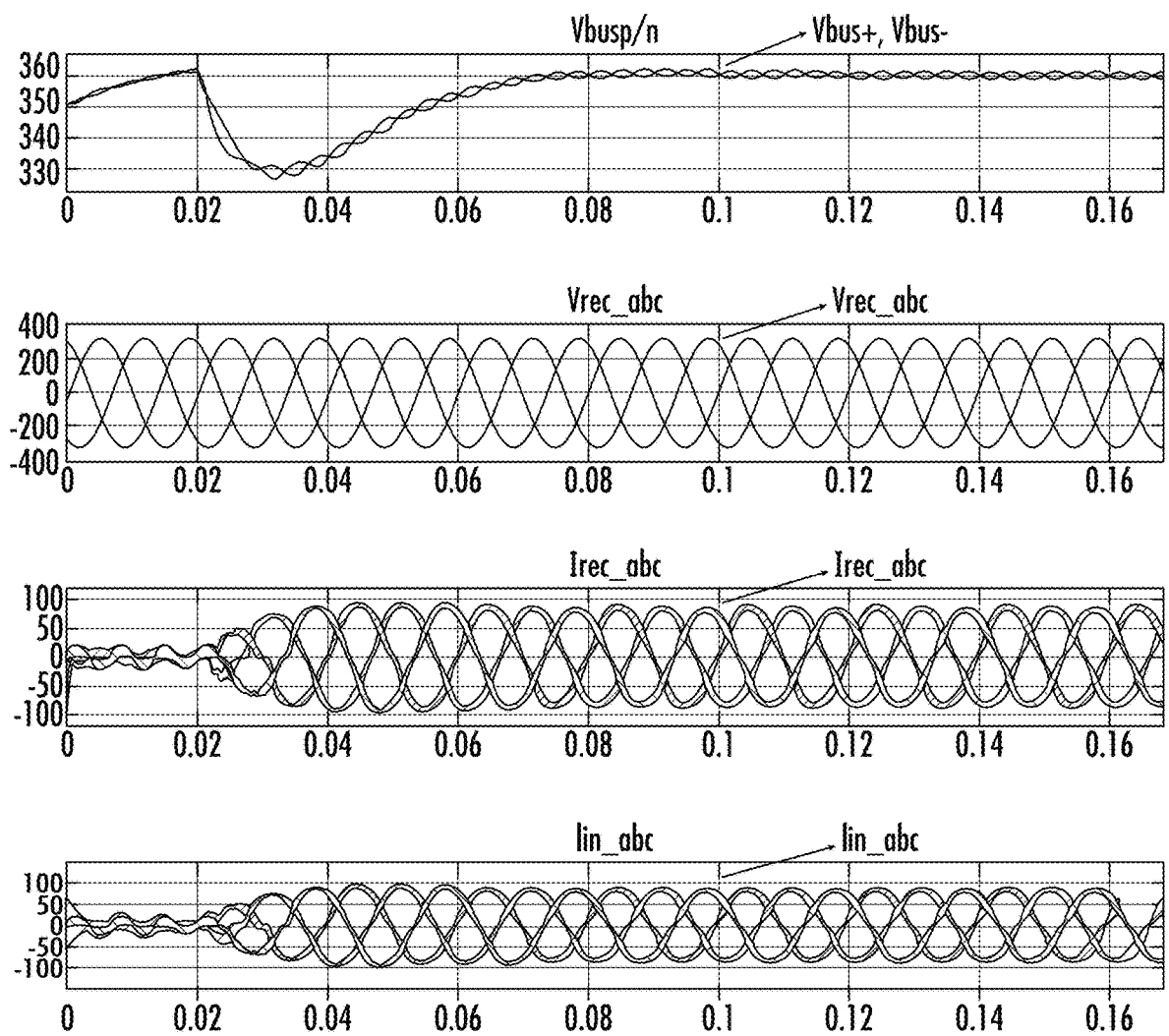
FIG. 15 is a schematic diagram of a simulation result regarding simulation of a rectification circuit in a full load steady state according to an embodiment of the present inventive concept.
Figure 16:
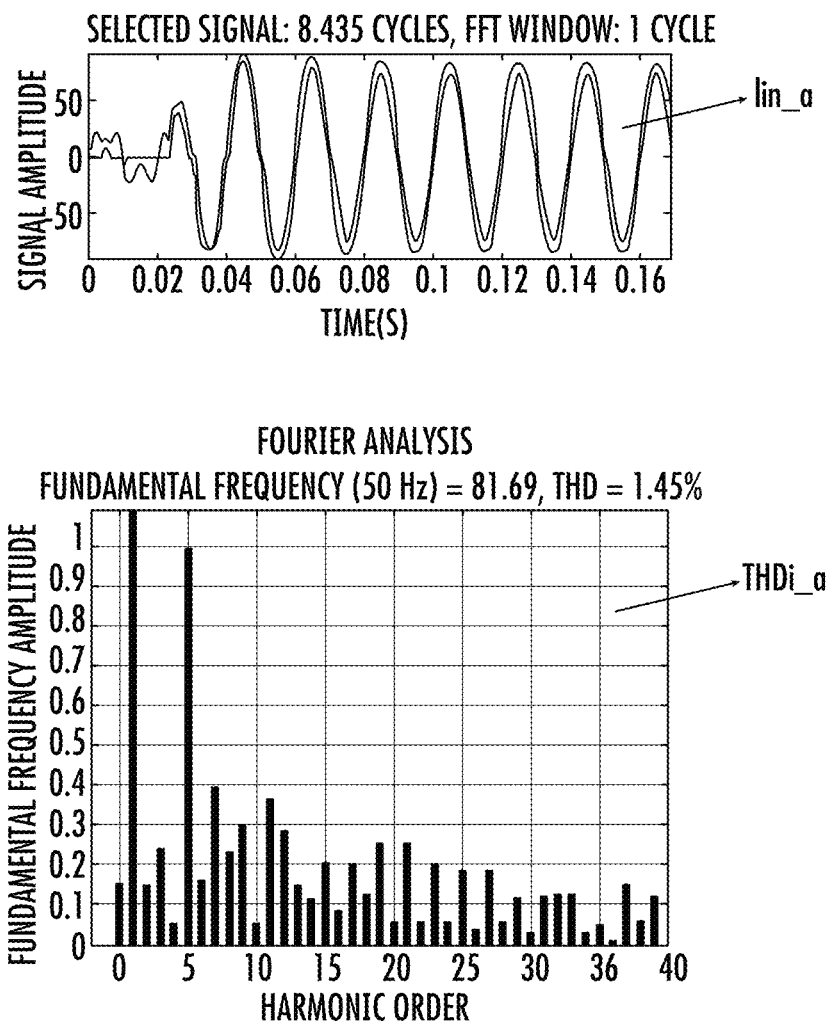
FIG. 16 is a schematic diagram of current harmonic data regarding simulation of a rectification circuit in a full load steady state according to an embodiment of the present inventive concept.

Referring to FIG. 15 and FIG. 16, FIG. 15 shows, in sequence from top to bottom, dynamic changes of a rectification bus voltage feedback positive terminal value and negative terminal value, a rectification three-phase voltage input value, a rectification input three-phase current feedback value, and a sorted input three-phase current value regarding simulation of a full load steady state, and FIG. 16 shows current harmonic data regarding simulation of rectification in a full load steady state. The current total harmonic distortion THDi=1.5%, meeting dynamic performance requirements on products.

Figure 17:
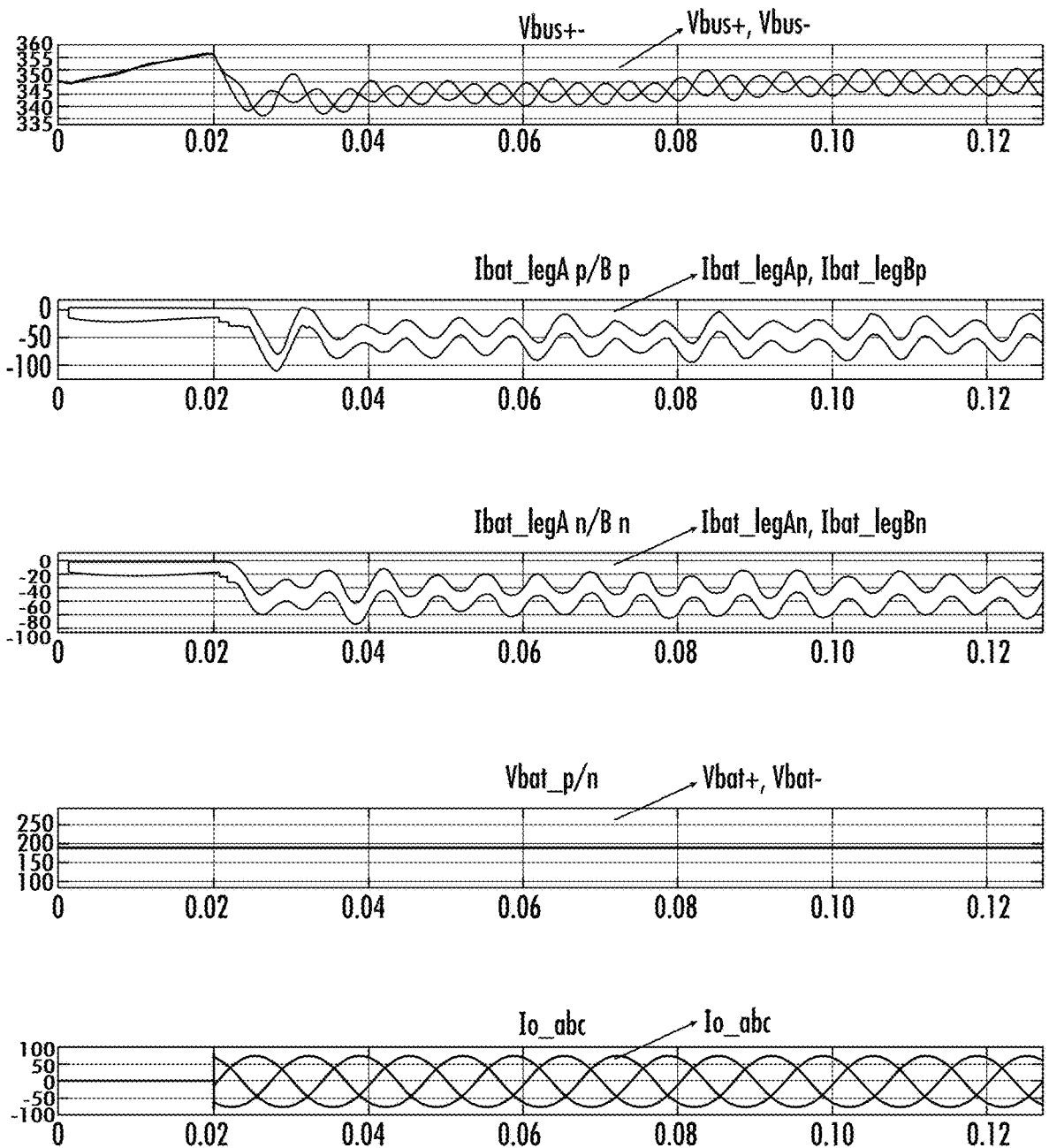
FIG. 17 is a schematic diagram of a simulation result regarding simulation of an interleaved boost full load steady state according to an embodiment of the present inventive concept.
Figure 18:
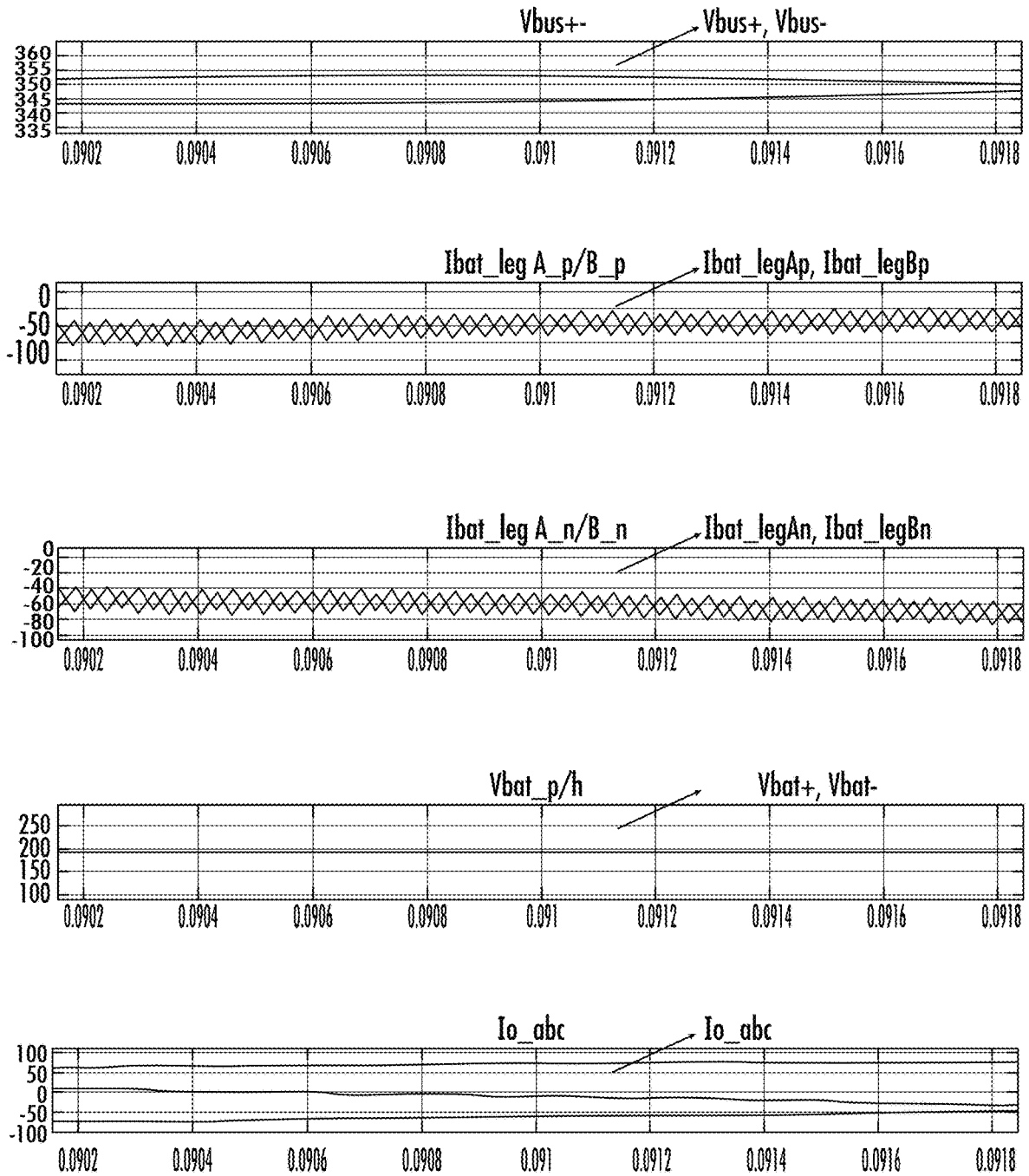
FIG. 18 shows data regarding simulation of interleaved leg shared currents having a phase shift of 180° in an interleaved boost full load steady state according to an embodiment of the present inventive concept.

Referring to FIG. 17 and FIG. 18, FIG. 17 shows, in sequence from top to bottom, a direct current bus voltage feedback positive terminal value and negative terminal value, a current positive value of direct current boost legs A and B, a current negative value of direct current boost legs A and B, a battery voltage positive terminal value and negative terminal value, and a shared current loop current value regarding simulation of a full load steady state, and FIG. 18 shows data regarding simulation of interleaved leg shared currents having a phase shift of 180°, which meets stability requirements on products.

Figure 19:
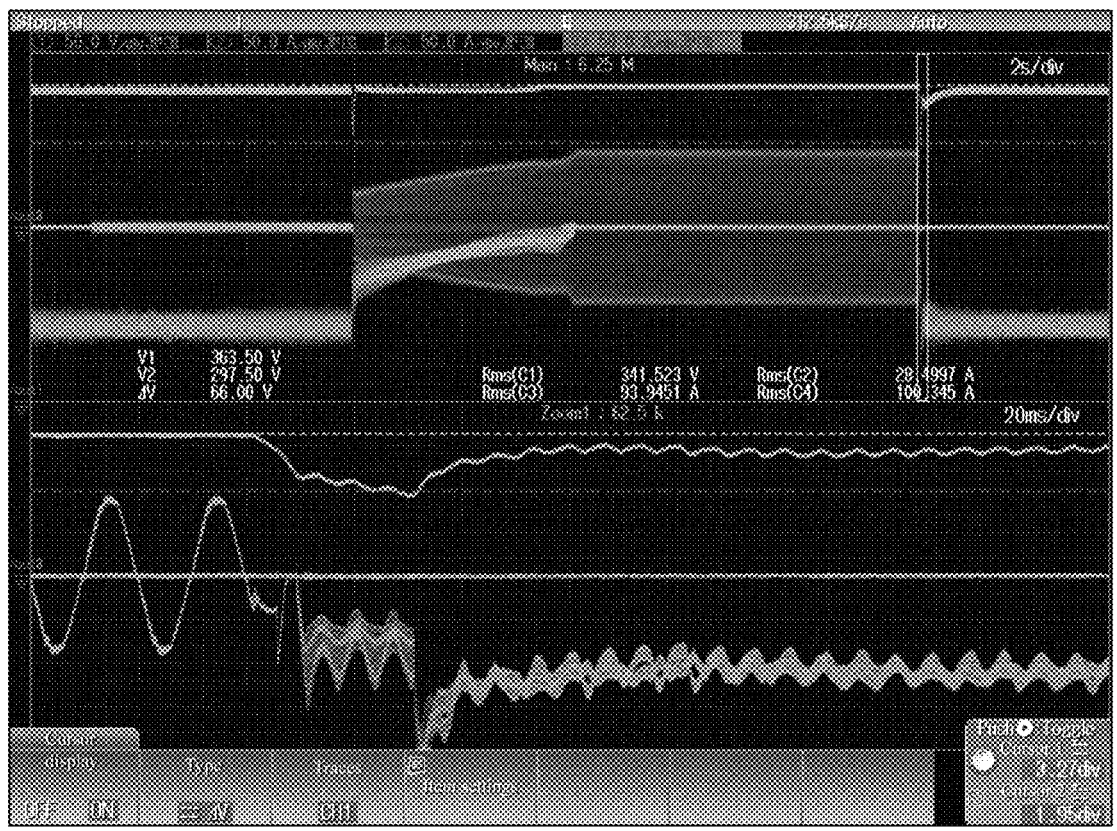
FIG. 19 is a schematic diagram of an emulation experiment result regarding a mains mode according to an embodiment of the present inventive concept.
Figures 20, 21:
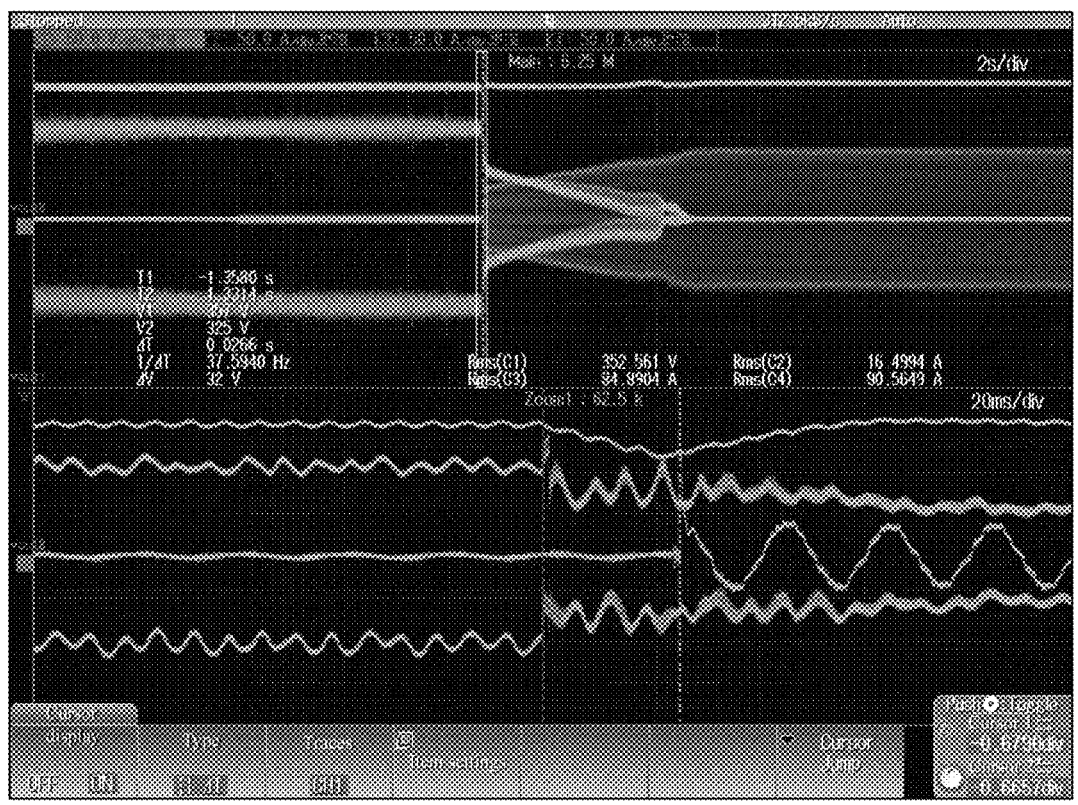
FIG. 20 is a harmonic table corresponding to the emulation result of FIG. 19 according to an embodiment of the present inventive concept.
FIG. 21 is a schematic diagram of an emulation experiment result regarding a battery mode according to an embodiment of the present inventive concept.

Reference is made to FIG. 19, FIG. 20, and FIG. 21. FIG. 19 shows an emulation experiment result regarding switching from the mains mode to the battery mode in a full load steady state. It can be seen that the mains power is lost, the rectification mode is disabled, and the boost mode is enabled (the direct current input $I_{in}$ decreases to 0, and the battery current $I_{bat}$ increases). FIG. 20 is a harmonic table of rectification, and the current total harmonic distortion THDi≈=2.5%. FIG. 21 shows switching from the battery mode to the mains mode in a full load steady state. It can be seen that the mains power resumes, the rectification mode is on, the boost leg leg A continues to operate, and the battery current $I_{bat}$ drops to 0. It can be seen that seamless switching between the mains mode and the battery mode can be achieved on the basis of the novel control system.

It can be seen from the above embodiments, simulation, and emulation that the present inventive concept provides optimized rectification control on the basis of the novel rectification topology, thereby achieving high stability and low THDi and supporting an unbalanced load. In addition, on the basis of the novel interleaved boost topology, provided is a novel interleaved boost control system, employing interleaved boost and compatible with a boost two-volt loop control system, and employing a novel boost leg current equalization loop, thereby achieving a good dynamic response and good current equalization performance. Rectification_ST has a secondary use as the battery boost leg_leg B, and a novel switching logic is achieved on the basis of the novel control system, thereby allowing for use in the mains and battery modes, and achieving an objective of using hardware to construct a novel UPS system having high performance and low costs.

It should be noted that although the steps are described above in a specific order, it is not indicated that the steps have to be performed in the specific order described above. In fact, some of these steps may be performed concurrently or even in a different order, so long as the desired function can be implemented.

The present inventive concept may be a system, a method, and a computer program product. The computer program product may include a computer readable storage medium having computer readable program instructions carried thereon for causing a processor to implement various aspects of the present invention.

The computer readable storage medium may be a tangible device that holds and stores instructions used by an instruction execution device. The computer readable storage medium may be, for example, but is not limited to, an electrical storage device, a magnetic storage device, an optical storage device, an electromagnetic storage device, a semiconductor storage device, or any suitable combination thereof. More specific examples of the computer readable storage medium (a non-exhaustive list) include: a portable computer disk, a hard disk, a random access memory (RAM), a read only memory (ROM), an erasable programmable read only memory (EPROM or flash memory), a static random access memory (SRAM), a portable compact disc read-only memory (CD ROM), a digital versatile disk (DVD), a memory stick, a floppy disk, a mechanical coding device, such as a punch card with instructions stored thereon or a structure of bumps within recessions, and any suitable combination thereof.

The embodiments of the present inventive concept have been described above. The foregoing description is illustrative rather than limiting, and is not limited to the disclosed embodiments. Many modifications and variations would be apparent to those ordinarily skilled in the art without departing from the scope and spirit of the illustrated embodiments. The selection of terms used herein aims to best explain the principles or practical applications of the embodiments, or the technical improvements thereof to the market, or to enable other ordinarily skilled in the art to understand the embodiments disclosed herein.

What is claimed is:

1. A stable control system for a three-phase rectification controller circuit comprising:
   a rectification voltage loop controller, for acquiring a rectification input direct current bus voltage set value and a direct current bus voltage feedback positive terminal value and negative terminal value, and calculating a current effective reference value according to a difference between the rectification input direct current bus voltage set value and the direct current bus voltage feedback positive terminal value and negative terminal value; and
   a rectification voltage loop unbalanced load optimization compensator, for calculating a rectification voltage loop unbalanced load optimization compensation parameter according to a preset transfer function and a current effective reference value, and performing feedback compensation on the current effective reference value based on the rectification voltage loop unbalanced load optimization compensation parameter so as to acquire a current direct current effective value, wherein the current direct current effective value is acquired by filtering out voltage harmonics from the current effective reference value by means of the rectification voltage loop unbalanced load optimization compensation parameter.

2. The system according to claim 1, further comprising:
   a rectification current feedback compensator, for acquiring a rectification input three-phase current feedback value, calculating a feedback compensation parameter based on a preset transfer function and the rectification input three-phase current feedback value, and performing harmonic gain amplification on harmonics in the rectification input three-phase current feedback value based on the feedback compensation parameter to acquire a harmonic current value having undergone gain amplification, wherein the harmonic current value is used for rectification input current feedback compensation control so as to attenuate harmonics in a rectification input current.

3. The system according to claim 2, further comprising: a rectification current loop controller, for acquiring a rectification current loop three-phase current set value and the harmonic current value, and calculating a rectification current loop control parameter based on a preset transfer function and a difference between the rectification current loop three-phase current set value and the harmonic current value, so as to acquire a rectification current loop control output duty cycle based on the rectification current loop control parameter, wherein the rectification current loop three-phase current set value is acquired by multiplying the current direct current effective value and a rectification current loop weight sine reference function, and the rectification current loop control output duty cycle is used to calculate the rectification input three-phase current feedback value and a rectification bus voltage feedback positive terminal value and negative terminal value.

4. The system according to claim 3, wherein a preset transfer function of the rectification voltage loop unbalanced load optimization compensator is:

$$G_{opt}(s) = \frac{s^2 + 2\omega_i s + \omega_o^2}{s^2 + 2\omega_i K_{opt} s + \omega_o^2},$$

where $\omega_i$ is an angular frequency deviation value, $\omega_o$ is an angular frequency of power frequency ripples, $K_{opt}$ is a compensation attenuation gain coefficient, and s is a control function operator.

5. The system according to claim 3, wherein a preset transfer function of the rectification voltage loop unbalanced load optimization compensator is:

$$G_{opt}(s) = G_{ubi}(s) \times G_{fil}(z),$$

wherein $G_{ubi}(s)$ is a notch filter, and a transfer function thereof is $$G_{ubi}(s) = \frac{s^2 + \lambda_1 s + \omega_o^2}{s^2 + \lambda_2 s + \omega_o^2},$$

where $\lambda_1$ is a zero-point damping coefficient, $\lambda_2$ is a pole damping coefficient, $\omega_o$ is an angular frequency of a compensation point, and s is a control function operator;

$G_{fil}(z)$ is a filter, and a transfer function thereof is $G_{fil}(z)$ =FIR(z), FIR(z) being a finite impulse filter, and z being a discrete domain operator.

6. The system according to claim 3, wherein the rectification current feedback compensator is a harmonic feedback compensator, and a preset transfer function thereof is:

$$G_{atn}(s) = H_{1th}(s) + \Sigma H_{2n+1}(s),$$

where $H_{1th}(s)$ is a rectification current first harmonic feedback compensator transfer function, $H_{2n+1}(s)$ is a rectification current odd harmonic feedback compensator transfer function, and s is a control function operator.

7. The system according to claim 3, wherein the rectification current feedback compensator is a harmonic feedback compensator, and a preset transfer function thereof is:

$$G_{atn\_prj}(s) = H_{1th}(s) + H_{3th}(s),$$

where $H_{1th}(s)$ is a rectification current first harmonic feedback compensator transfer function, $H_{3th}(s)$ is a rectification current third harmonic feedback compensator transfer function, and s is a control function operator.

* * * * *